US012641634B2

(12) United States Patent
Sarkis et al.

(10) Patent No.: US 12,641,634 B2
(45) Date of Patent: May 26, 2026

(54) PRIORITIZATION OF INTER-UE COORDINATION INFORMATION

(71) Applicant: QUALCOMM Incorporated, San Diego, CA (US)

(72) Inventors: Gabi Sarkis, San Diego, CA (US); Tien Viet Nguyen, Bridgewater, NJ (US); Sourjya Dutta, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/647,965

(22) Filed: Jan. 13, 2022

(65) Prior Publication Data

US 2022/0240265 A1 Jul. 28, 2022

Related U.S. Application Data

(60) Provisional application No. 63/140,771, filed on Jan. 22, 2021.

(51) Int. Cl.
| | |
|---|---|
| *H04W 72/56* | (2023.01) |
| *H04L 5/00* | (2006.01) |
| *H04W 72/20* | (2023.01) |

(52) U.S. Cl.
CPC ........... *H04W 72/56* (2023.01); *H04L 5/0037* (2013.01); *H04W 72/20* (2023.01)

(58) Field of Classification Search
CPC ...... H04W 72/56; H04W 72/20; H04L 5/0037
See application file for complete search history.

(56) References Cited

U.S. PATENT DOCUMENTS

| | | | | |
|---|---|---|---|---|
| 2020/0205165 A1* | 6/2020 | Huang | .................. | H04L 5/0053 |
| 2020/0351057 A1* | 11/2020 | Yeo | ........................ | H04L 1/1854 |
| 2020/0396747 A1* | 12/2020 | Lee | ........................ | H04W 72/54 |
| 2021/0127383 A1* | 4/2021 | Hui | ........................ | H04L 1/1812 |
| 2021/0218511 A1* | 7/2021 | Zhang | .................. | H04W 72/02 |
| 2022/0006569 A1* | 1/2022 | Lee | ........................ | H04W 72/02 |

(Continued)

OTHER PUBLICATIONS

Kyocera: "Inter-UE Coordination for Mode2", 3GPP Draft, R1-2007771, 3GPP TSG-RAN WG1#103e, 3rd Generation Partnership Project (3GPP), Mobile Competence Centre, 650, Route Des Lucioles, F-06921, Sophia-Antipolis Cedex, France, vol. RAN WG1, No. e-meeting, Oct. 26, 2020-Nov. 13, 2020, Oct. 16, 2020 (Oct. 16, 2020), XP051939385, 4 Pages, Retrieved from the Internet: URL: https://ftp.3gpp.org/tsg_ran/WG1_RL1/TSGR1_103-e/Docs/R1-2007771.zip R1-2007771.doc [retrieved on Oct. 16, 2020] p. 1, paragraph before Proposal 1, and p. 2.

(Continued)

*Primary Examiner* — Shean Tokuta
(74) *Attorney, Agent, or Firm* — Procopio, Cory, Hargreaves & Savitch LLP

(57) ABSTRACT

A user equipment (UE) determines that a first transmission or first reception of a first sidelink transmission comprising inter-UE coordination information will overlap in time with a second reception or a second transmission of a second sidelink transmission. The UE transmits or receives a higher priority sidelink transmission among the first sidelink transmission comprising the inter-UE coordination information and the second sidelink transmission.

37 Claims, 12 Drawing Sheets

(56)       References Cited

U.S. PATENT DOCUMENTS

| | | | | |
|---|---|---|---|---|
| 2022/0053460 | A1* | 2/2022 | Yu | H04W 76/28 |
| 2022/0322359 | A1* | 10/2022 | Ye | H04W 72/02 |

OTHER PUBLICATIONS

LG Electronics: "Discussion on Feasibility and Benefits for Mode 2 Enhancements", Draft, R1-2100518, 3GPP TSG RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971027, 26 pages, URL:https://ftp.3gpp.org/tsg_ran/WG1_RL1/TSGR1_104-e/Docs/R1-2100518.zip [retrieved on Jan. 19, 2021] p. 5, chaps. 1-3, last para., qn. Q-A2, pp. 7-9, the whole document.

Moderator (LG Electronics): "Feature Lead Summary for AI 8.11. 2.2 Feasibility and Benefits for Mode 2 Enhancements", 3GPP Draft, R1-2009788, #3GPP TSG RAN WG1 #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Nov. 19, 2020 (Nov. 19, 2020), XP051955958, pp. 1-79, URL: https://ftp.3gpp.org/tsg_ran/WG1_RL1/TSGR1_103-e/Docs/R1-2009788.zip [retrieved on Nov. 19, 2020] Qn. Q2, pp. 18-20.

Partial International Search Report—PCT/US2022/012566—ISA/EPO—May 3, 2022.

Qualcomm Incorporated: "Reliability and Latency Enhancements for Mode 2", Draft, R1-2006829, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1. No. Aug. 17, 2020-Aug. 28, 2020, Aug. 8, 2020 (Aug. 8, 2020), XP051918279, 10 Pages, URL:https://ftp.3gpp.org/tsg_ran/WG1_RL1/TSGR1_102-e/Docs/R1-2006829.zip, [retrieved-on Aug. 8, 2020], s. 3, p. 3-p. 5, s. 4, p. 5-p. 6, the Whole Document, Ss. 1, 3, 7.

Fujitsu: "Considerations on Inter-UE Coordination for Mode 2 Enhancements", 3GPP TSG RAN WG1 #102-e, R1-2005546, 3rd Generation Partnership Project (3GPP), Mobile Competence Centre, 650, Route Des Lucioles, F-06921 Sophia-Antipolis Cedex, France, e-Meeting, Aug. 17, 2020-Aug. 28, 2020, Aug. 7, 2020, XP051914984, pp. 1-11.

International Search Report and Written Opinion—PCT/US2022/012566—ISA/EPO—Aug. 4, 2022 (25 pages).

LG Electronics: "Discussion on Feasibility and Benefits for Mode 2 Enhancement", 3GPP TSG RAN WG1 Meeting #103-e, R1-2007896, 3rd Generation Partnership Project, Mobile Competence Centre, 650, Route Des Lucioles, F-06921 Sophia-Antipolis Cedex, France, vol. RAN WG1, No. e-Meeting Oct. 26, 2020-Nov. 13, 2020, Oct. 24, 2020, XP051946544, 26 Pages.

Robert Bosch GMBH: "Discussion on Sidelink Mode-2 Resource Allocation Enhancements", 3GPP TSG RAN WG1 #103-e, R1-2009127, 3rd Generation Partnership Project, Mobile Competence Centre, 650, Route Des Lucioles, F-06921 Sophia-Antipolis Cedex, France, vol. RAN WG1, No. E-Meeting; Oct. 26, 2020-Nov. 13, 2020 Oct. 24, 2020, XP051946844, 7 Pages.

* cited by examiner

Figures 10A, 10B:
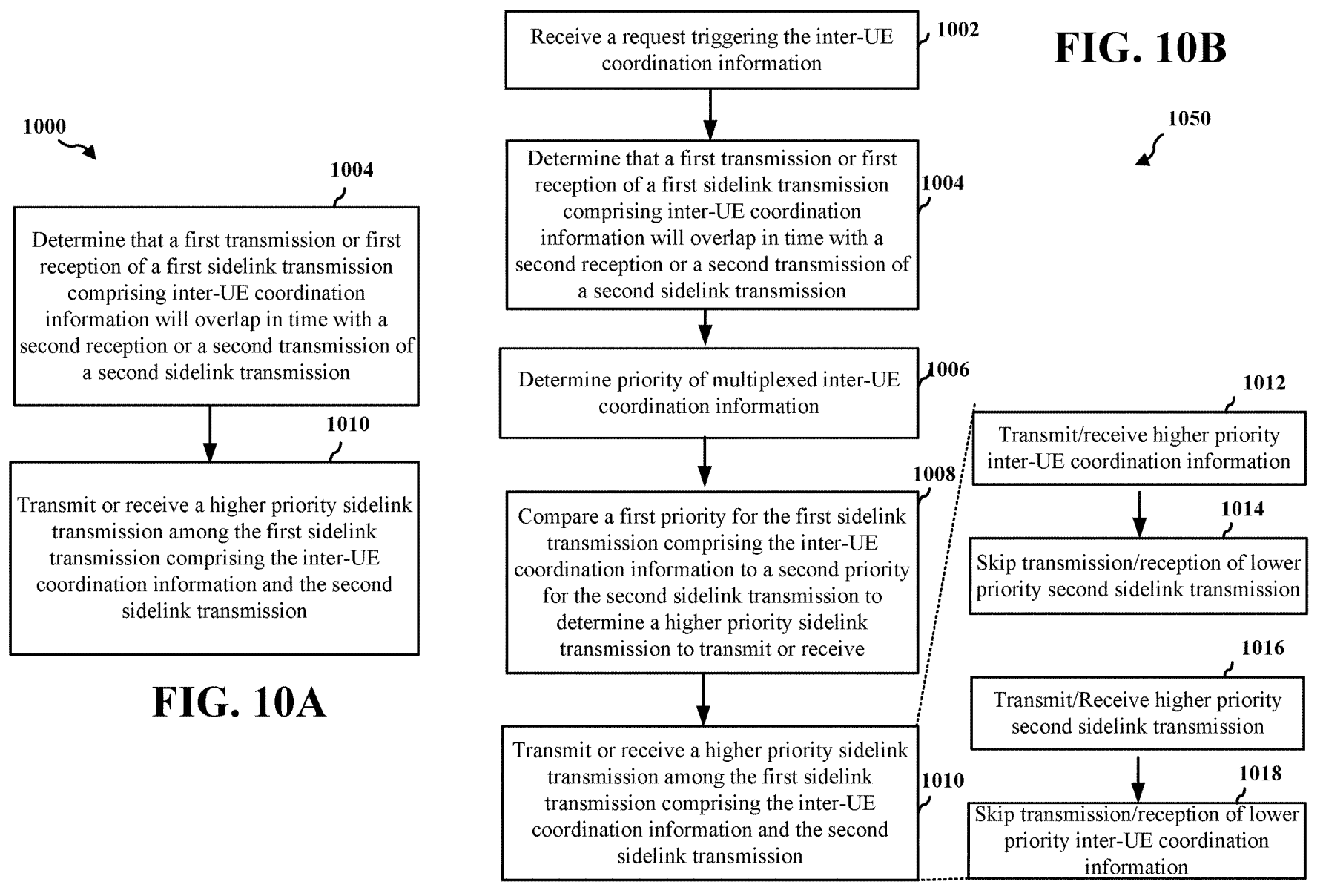

1002 — Receive a request triggering the inter-UE coordination information

1004 — Determine that a first transmission or first reception of a first sidelink transmission comprising inter-UE coordination information will overlap in time with a second reception or a second transmission of a second sidelink transmission 1006 — Determine priority of multiplexed inter-UE coordination information 1008 — Compare a first priority for the first sidelink transmission comprising the inter-UE coordination information to a second priority for the second sidelink transmission to determine a higher priority sidelink transmission to transmit or receive 1010 — Transmit or receive a higher priority sidelink transmission among the first sidelink transmission comprising the inter-UE coordination information and the second sidelink transmission 1012 — Transmit/receive higher priority inter-UE coordination information 1014 — Skip transmission/reception of lower priority second sidelink transmission 1016 — Transmit/Receive higher priority second sidelink transmission 1018 — Skip transmission/reception of lower priority inter-UE coordination information

1004 — Determine that a first transmission or first reception of a first sidelink transmission comprising inter-UE coordination information will overlap in time with a second reception or a second transmission of a second sidelink transmission 1010 — Transmit or receive a higher priority sidelink transmission among the first sidelink transmission comprising the inter-UE coordination information and the second sidelink transmission

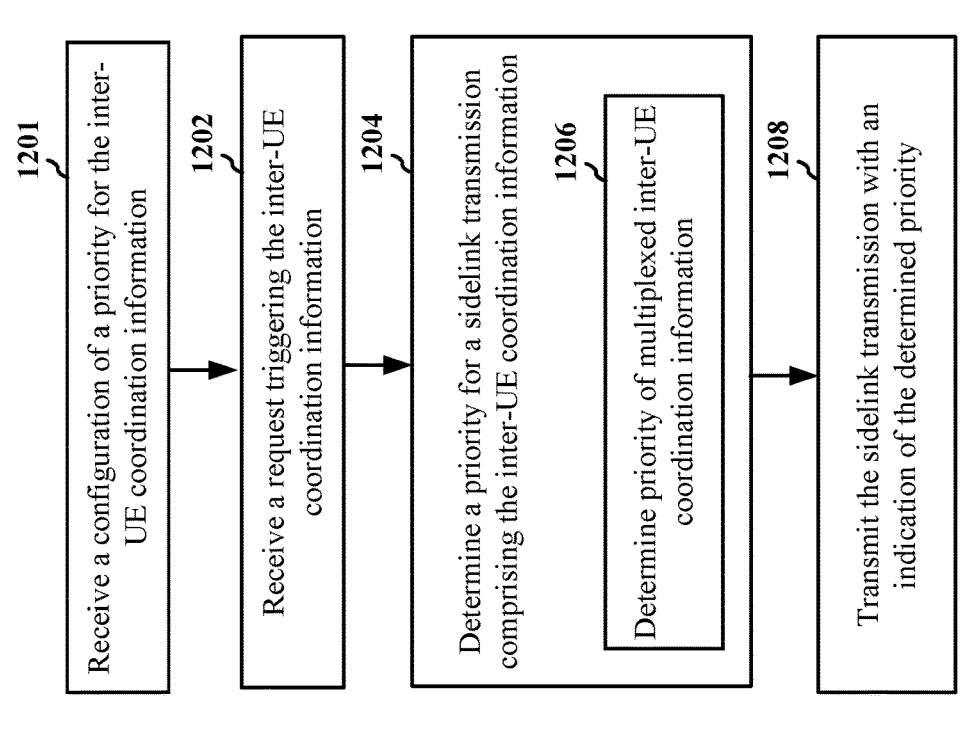

1201 Receive a configuration of a priority for the inter-UE coordination information 1202 Receive a request triggering the inter-UE coordination information 1204 Determine a priority for a sidelink transmission comprising the inter-UE coordination information 1206 Determine priority of multiplexed inter-UE coordination information 1208 Transmit the sidelink transmission with an indication of the determined priority

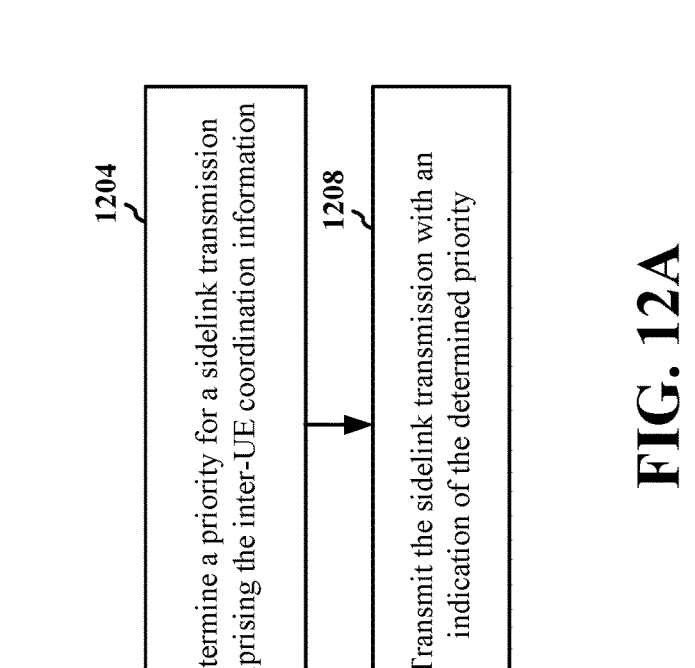

1204 Determine a priority for a sidelink transmission comprising the inter-UE coordination information 1208 Transmit the sidelink transmission with an indication of the determined priority

PRIORITIZATION OF INTER-UE COORDINATION INFORMATION

CROSS REFERENCE TO RELATED APPLICATION(S)

This application claims the benefit of and priority to U.S. Provisional Application Ser. No. 63/140,771, entitled "Prioritization of Inter-UE Coordination Information" and filed on Jan. 22, 2021, which is expressly incorporated by reference herein in its entirety.

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a user equipment (UE), or another device communicating based on sidelink. The apparatus determines that a first transmission or first reception of a first sidelink transmission comprising inter-UE coordination information will overlap in time with a second reception or a second transmission of a second sidelink transmission. The apparatus transmits or receives a higher priority sidelink transmission among the first sidelink transmission comprising the inter-UE coordination information and the second sidelink transmission.

In another aspect of the disclosure, a method, a computer-readable medium, and an apparatus are provided. The method may be performed by a user equipment (UE), or another device communicating based on sidelink. The apparatus determines a priority level for a sidelink transmission comprising inter-UE coordination information, and transmits the sidelink transmission with an indication of the determined priority level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 10A and 10B are flowcharts of methods of wireless communication.

FIGS. 12A and 12B are flowcharts of methods of wireless communication in accordance with various aspects presented herein.

DETAILED DESCRIPTION

Figure 1:
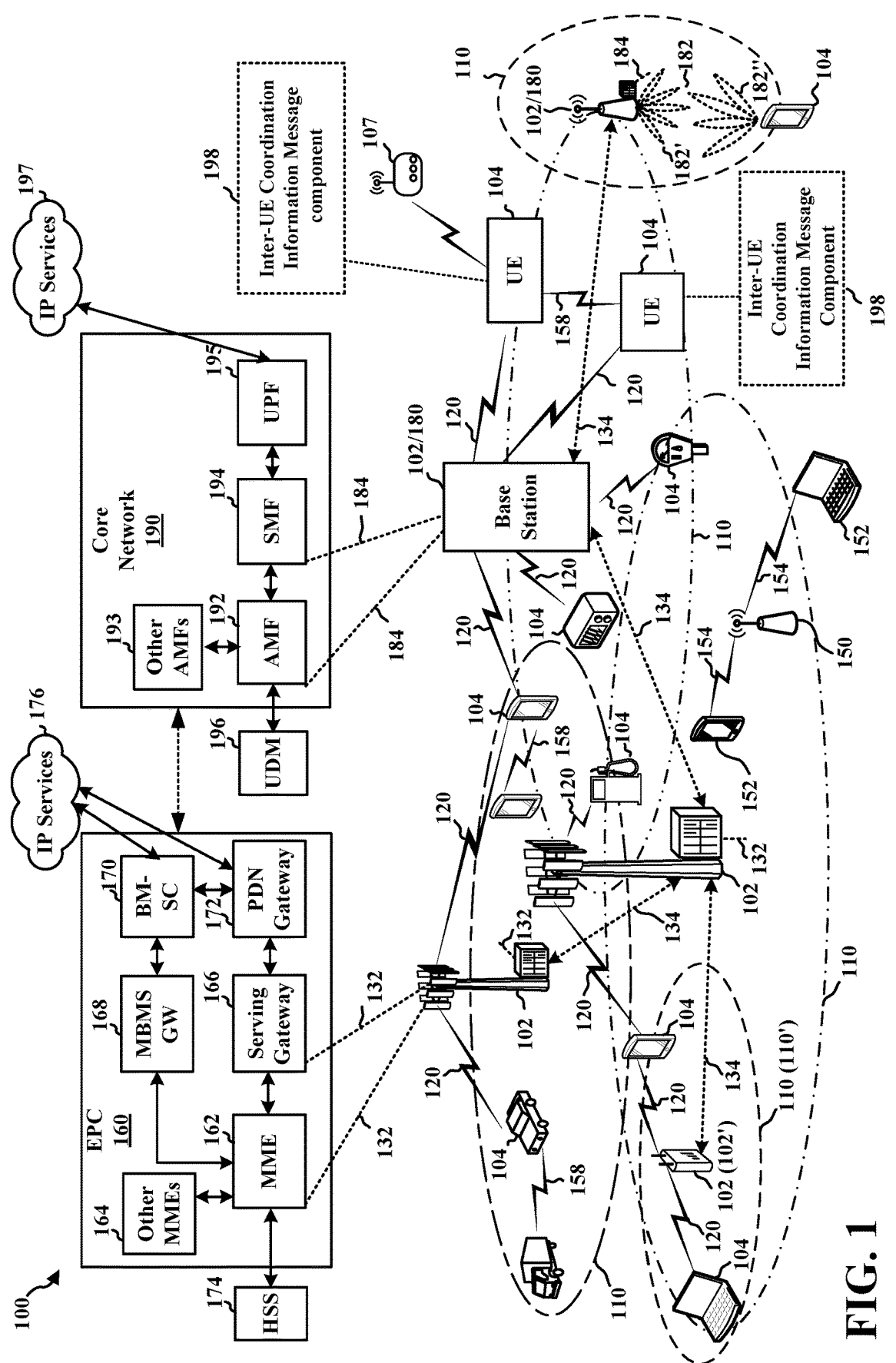
FIG. 1 is a diagram illustrating an example of a wireless communications system and an access network including sidelink communication in accordance with various aspects presented herein.

In a decentralized sidelink resource allocation mode, rather than receiving an allocation of sidelink resources from a network entity, a UE may determine the sidelink transmission resource(s) based on a sensing and resource reservation procedure, e.g., where each sidelink device selects its own sidelink resources for sidelink transmissions. In some aspects, one or more UEs may exchange inter-UE coordination information in order to share sensing information including resource availability, share candidate resources for transmission, share resources for a transmission, share indications of half-duplex issues, and/or share indications of resource collision. The information shared in the inter-UE coordination information may enable the UEs to make improved resource selection for sidelink transmissions. The inter-UE coordination information may be transmitted using various different mechanisms. Among other examples, a UE may transmit inter-UE coordination information in a physical sidelink feedback channel (PSFCH), in sidelink control information SCI), in a medium access control-control element (MAC-CE), in a physical channel that is configured for or dedicated to inter-UE configuration information, and/or in radio resource control (RRC) signaling.

At times, transmission or reception of the inter-UE coordination information may overlap in time with transmission or reception of other sidelink communication. If the UE operates in a half-duplex mode, the UE may prioritize transmission of one signal over reception of the other signal or reception of one signal over transmission of the other signal. A UE may be unable to receive inter-UE coordination information while receiving another sidelink message, e.g., due to a simultaneous reception limit. Similarly, a UE may be unable to transmit inter-UE coordination information while transmitting another sidelink message, e.g., due to a simultaneous transmission limit.

Aspects presented herein provide various mechanisms for the UE to determine how to handle the transmission/reception of inter-UE coordination information that overlaps in time with transmission/reception of another sidelink message. For example, the UE may determine that a first transmission or first reception of a first sidelink transmission comprising inter-UE coordination information will overlap in time with a second reception or a second transmission of a second sidelink transmission and to transmit/receive a higher priority sidelink transmission among the first sidelink transmission comprising the inter-UE coordination information and the second sidelink transmission. In some aspects, the UE may determine a priority level for a sidelink transmission comprising inter-UE coordination information, and transmit the sidelink transmission with an indication of the determined priority level.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 UEs 104 communicating based on sidelink to exchange communication directly between the UEs 104, e.g., using a device-to-device (D2D) communication link 158. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc.

In a first sidelink resource allocation mode, a UE may receive a resource allocation for sidelink communication from a central entity, such as a base station 102 or 180. The sidelink resource allocation from a base station may be referred to as "resource allocation mode 1" or a "centralized" resource allocation mode, e.g., in which a network entity allocates sidelink resources for multiple sidelink devices. In a second resource allocation mode, a UE 104 may autonomously determine resources for sidelink transmissions by sensing, or monitoring, for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. In the decentralized sidelink resource allocation mode, rather than receiving an allocation of sidelink resources from a network entity, a UE 104 may determine the sidelink transmission resource(s) based on a sensing and resource reservation procedure. UEs 104 may exchange inter-UE coordination information in order to share sensing information including resource availability, share candidate resources for transmission, share resources for a transmission, share indications of half-duplex issues, and/or share indications of resource collision. The information shared in the inter-UE coordination information may enable the UEs to make improved resource selection for sidelink transmissions. The inter-UE coordination information may be transmitted using various different mechanisms. In some examples, the mechanism may be based on a payload size of the inter-UE coordination information. Among other examples, a UE may transmit inter-UE coordination information in a physical sidelink feedback channel, in sidelink control information SCI), in a medium access control-control element (MAC-CE), in a physical channel that is configured for or dedicated to inter-UE configuration information, and/or in radio resource control (RRC) signaling.

At times, transmission or reception of the inter-UE coordination information may overlap in time with transmission or reception of other sidelink communication. If the UE operates in a half-duplex mode, the UE may need to prioritize transmission of one signal over reception of the other signal or reception of one signal over transmission of the other signal. A UE may be unable to receive inter-UE coordination information while receiving another sidelink message, e.g., due to a simultaneous reception limit. Similarly, a UE may be unable to transmit inter-UE coordination information while transmitting another sidelink message, e.g., due to a simultaneous transmission limit.

Aspects presented herein provide various mechanisms for the UE to determine how to handle the transmission/reception of inter-UE coordination information that overlaps in time with transmission/reception of another sidelink message. For example, the UE 104 may include an inter-UE coordination information message component 198 that is configured to determine that a first transmission or first reception of a first sidelink transmission comprising inter-UE coordination information will overlap in time with a second reception or a second transmission of a second sidelink transmission and to transmit/receive a higher priority sidelink transmission among the first sidelink transmission comprising the inter-UE coordination information and the second sidelink transmission. In some aspects, the inter-UE coordination information message component 198 may be configured to determine a priority level for a sidelink transmission comprising inter-UE coordination information, to transmit the sidelink transmission with an indication of the determined priority level.

For example, the UE 104 may be configured to transmit higher priority inter-UE coordination information and to skip reception of the second, lower priority sidelink transmission. The UE 104 may be configured to receive the higher priority sidelink transmission and to skip transmission of the lower priority inter-UE coordination information. The UE 104 may be configured to transmit a higher priority sidelink transmission and to skip reception of the lower priority inter-UE coordination information. The UE 104 may be configured to receive the higher priority inter-UE coordination information and to skip transmission of the lower priority sidelink message. The UE 104 may be configured to receive the higher priority inter-UE coordination information and to skip reception of the lower priority sidelink message. The UE 104 may be configured to receive the higher priority sidelink message and to skip reception of the lower priority inter-UE coordination information. The UE 104 may be configured to transmit the higher priority inter-UE coordination information and to skip transmission of the lower priority sidelink message. The UE 104 may be configured to transmit the higher priority sidelink message and to skip transmission of the lower priority inter-UE coordination information.

In some aspects, a priority level of the inter-UE coordination information may be configured or defined. In some aspects, the priority level of the inter-coordination information may be based on the priority level of a related transmission, e.g., a transmission to which the shared inter-UE coordination information relates or a transmission of a request that triggers the inter-UE coordination information. In some aspects, the inter-UE coordination information may be multiplexed with another sidelink transmission, e.g., and the priority level of the inter-UE coordination information may be based, at least in part, on the priority of the sidelink transmission with which the inter-UE coordination information is multiplexed.

In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
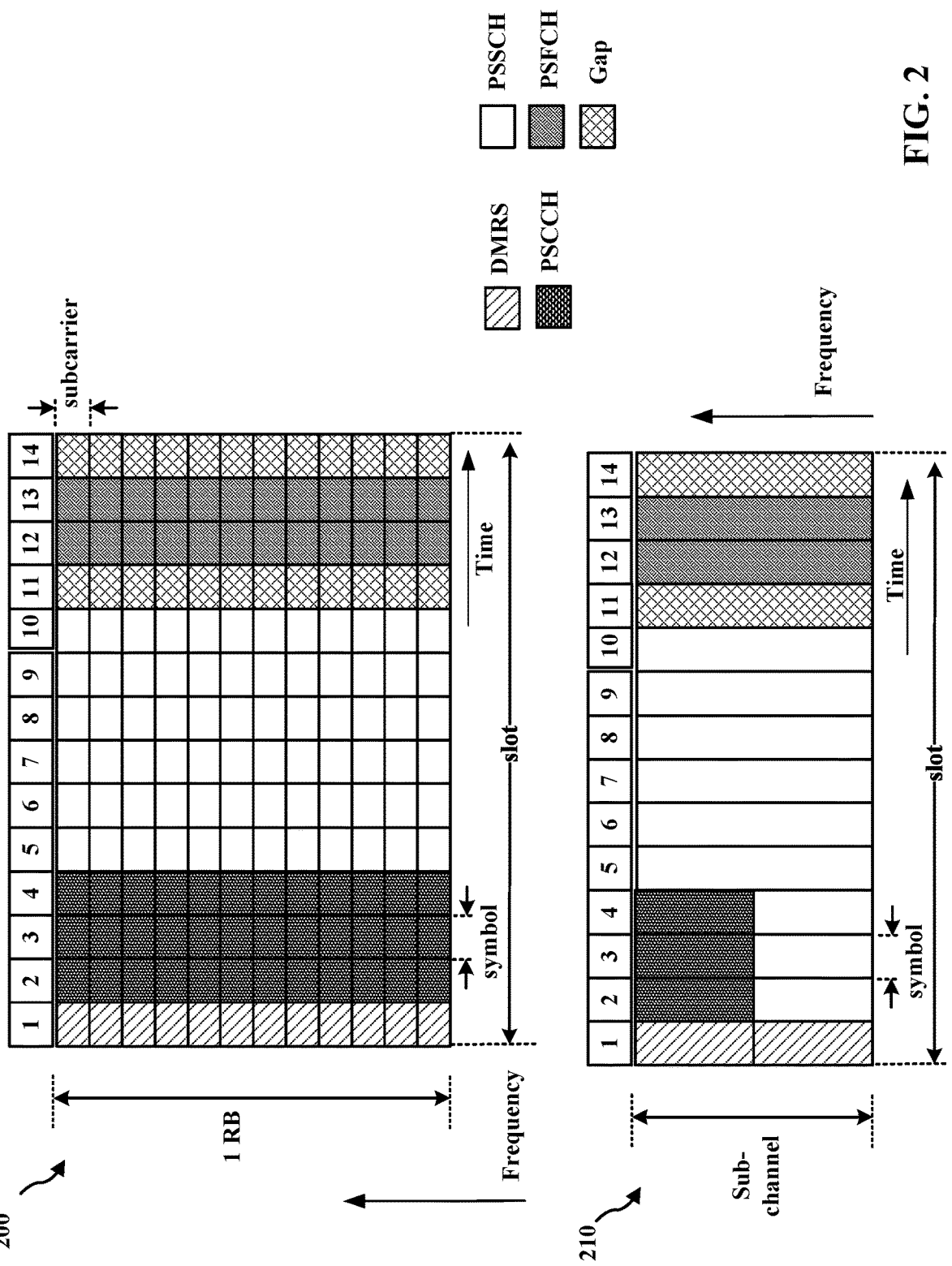
FIG. 2 illustrates example aspects of a sidelink slot structure in accordance with various aspects presented herein.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
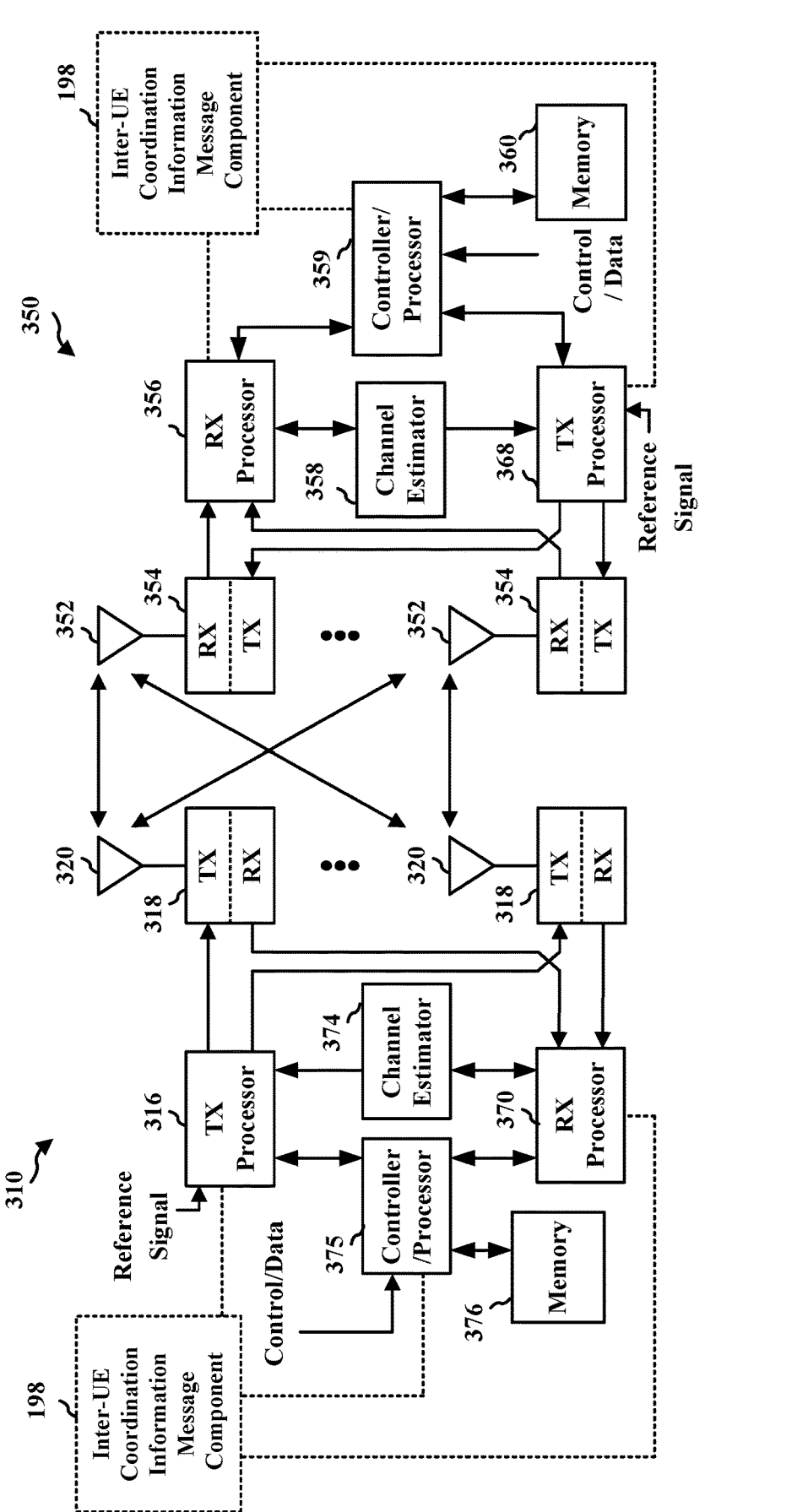
FIG. 3 is a diagram illustrating an example of a first device and a second device involved in wireless communication based, e.g., on sidelink in accordance with various aspects presented herein.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

As illustrated in FIG. 3, at least one of the TX processor 316 or 368, the RX processor 356 or 370, and the controller/processor 359 or 375 may be configured to perform aspects in connection with the inter-UE coordination information message component 198 of FIG. 1.

A sidelink device, such as a UE, may autonomously determine resources for sidelink transmissions by sensing, or monitoring, for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. In contrast to a centralized resource allocation mode (e.g., resource allocation mode 1) in which a network entity may assign sidelink resources, in the decentralized sidelink resource allocation mode, a UE may autonomously select sidelink transmission resources based on a sensing and resource reservation procedure.

When a sidelink device, such as a UE, is preparing to transmit data, the sidelink device may select transmission resources from a candidate resource set from which previously reserved resources are excluded. In order to maintain the candidate resource set, the sidelink device may monitor for resource reservations from other sidelink devices. For example, the sidelink device may receive SCI from other UEs including reservation information in a resource reservation field. The number of resources (e.g., sub-channels per subframe) reserved by a UE may depend on the size of data to be transmitted by the UE. Although the example is described for a UE receiving reservations from another UE, the reservations may also be received from an RSU or other device communicating based on sidelink. The sidelink device may exclude resources that are used and/or reserved by the other UEs from a candidate resource set. The exclusion of the reserved resources enables the UE to select/reserve resources for a transmission from the resources that are unused/unreserved. Although the example is described for a UE receiving reservations from another UE, the reservations may also be received from an RSU or other device communicating based on sidelink.

Figure 4:
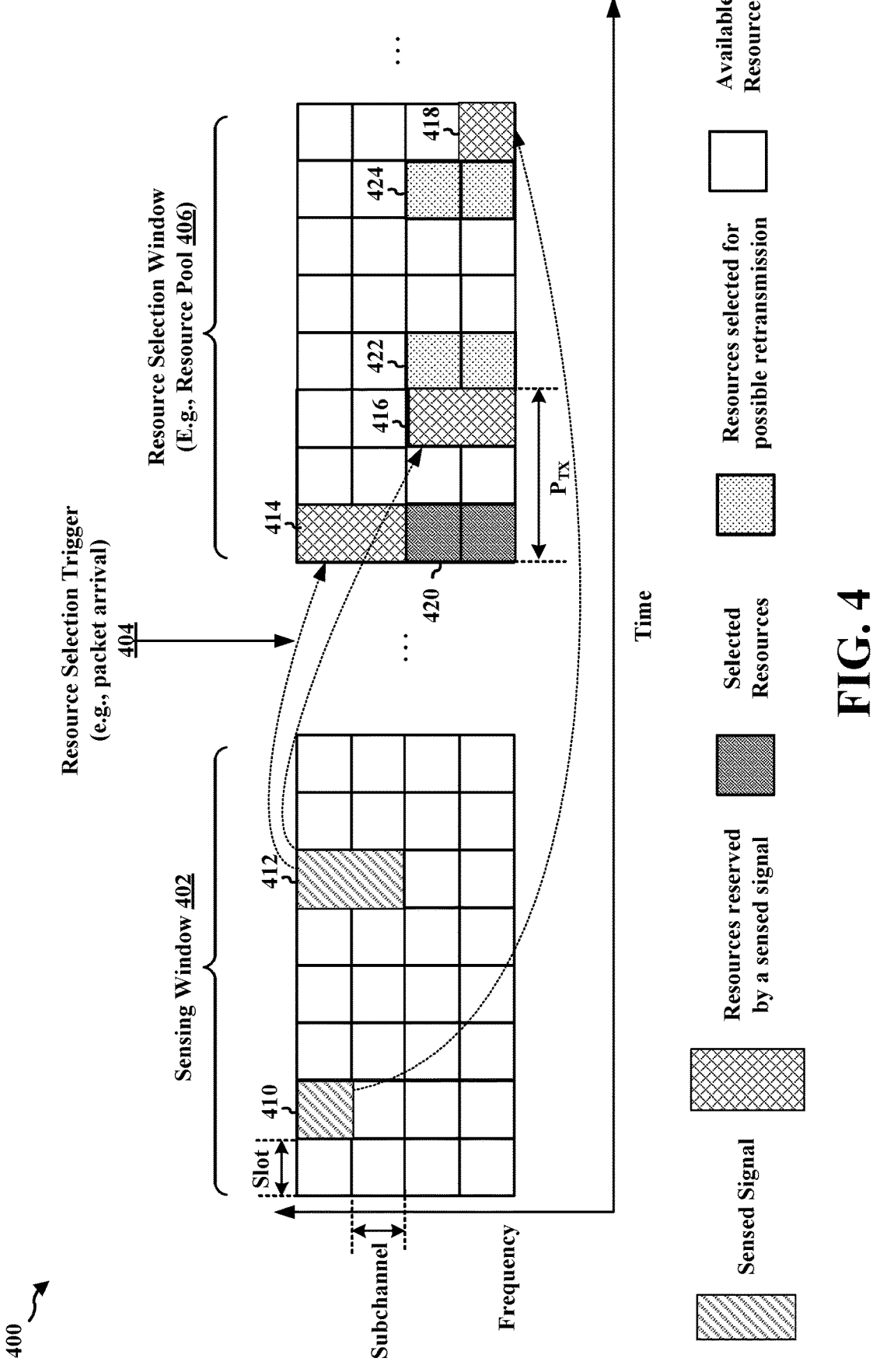
FIG. 4 is a diagram illustrating example aspects of sensing and resource reservation for sidelink communication based on resource allocation mode 2 in accordance with various aspects presented herein.

FIG. 4 is a diagram showing time frequency resources for sidelink sensing and resource selection, e.g., mode 2 resource allocation. FIG. 4 shows transmissions 410 and 412 indicating resource reservations for sidelink transmissions. The resource reservations for each UE may be in units of one or more sub-channels in the frequency domain (e.g., sub-channels 1 to 4), and may be based on one slot in the time domain. A UE may use resources in a first slot to perform an initial transmission, and may reserve resources in one or more future slots, e.g., for retransmissions. In some examples, up to two different future slots may be reserved by a particular UE for retransmissions. The reserved resource may be used for a retransmission of a packet or for transmission of a different packet. For example, the reservation may be for two retransmissions or for more than two retransmissions. The reservation may be for an initial transmission and a single transmission. The reservation may be for an initial transmission. The resource reservation may be chained, e.g., with a transmission A indicating a resource for transmission B. Transmission B may then indicate a resource for transmission C, and transmission C may indicate a resource for transmission D. The pattern may continue with transmission D indicating future resources. In another example, transmission A may indicate resources for transmissions B and C. Then, transmission B may indicate resources for transmissions C and D. The pattern may continue with transmission D indicating future resources.

A sidelink device may identify available resources in a future resource selection window 406 by monitoring for resource reservations during a sensing window 402. The sensing window may be based on a range of slots and sub-channels. FIG. 4 illustrates an example sensing window including 8 consecutive time slots and 4 consecutive sub-channels, which spans 32 resource blocks. The sidelink device may monitor resources of a sidelink resource pool, over the slots of the sensing window. FIG. 4 illustrates that sidelink transmission 410 indicates a resource reservation for resource 418, and sidelink transmission 412 indicates a resource reservation for resources 414 and 422. For example, the sidelink transmissions 410 and 412 may each include SCI that indicates the corresponding resource reservation. Resource reservations may be periodic or aperiodic. Different reservations of resources may have different priority levels, e.g., with the priority level indicated in the SCI.

A sidelink device receiving the transmissions 410 and 412 may exclude the resources 414, 416, and 418 as candidate resources in a candidate resource set based on the resource selection window 406. In some examples, the sidelink device may exclude the resources 414, 416, or 418 based on whether a measured RSRP for the received SCI (e.g., in 410 or 412) meets a threshold. When a resource selection trigger occurs at 404, such as the sidelink device having a packet for sidelink transmission, the sidelink device may select resources for the sidelink transmission (e.g., including PSCCH and/or PSSCH) from the remaining resources of the resource pool within the resource selection window 406 after the exclusion of the reserved resources (e.g., 414, 416, and 418). FIG. 4 illustrates an example in which the sidelink device selects the resource 420 for sidelink transmission. The sidelink device may also select resources 422 and/or 424 for a possible retransmission. After selecting the resources for transmission, the sidelink device may transmit SCI indicating a reservation of the selected resources. Thus, each sidelink device may use the sensing/reservation procedure to select resources for sidelink transmissions from the available candidate resources that have not been reserved by other sidelink devices.

In some instances, multiple UEs may transmit at the same time and may not receive the overlapping communication (e.g., SCI indicating resource reservations) from each other and/or from a base station. Thus, UEs on a sidelink may miss or be unaware of transmissions and reservations by other UEs, in some circumstances. Therefore, the two UEs may reserve the same resource block for future transmission, which may result in a resource collision.

Figure 5:
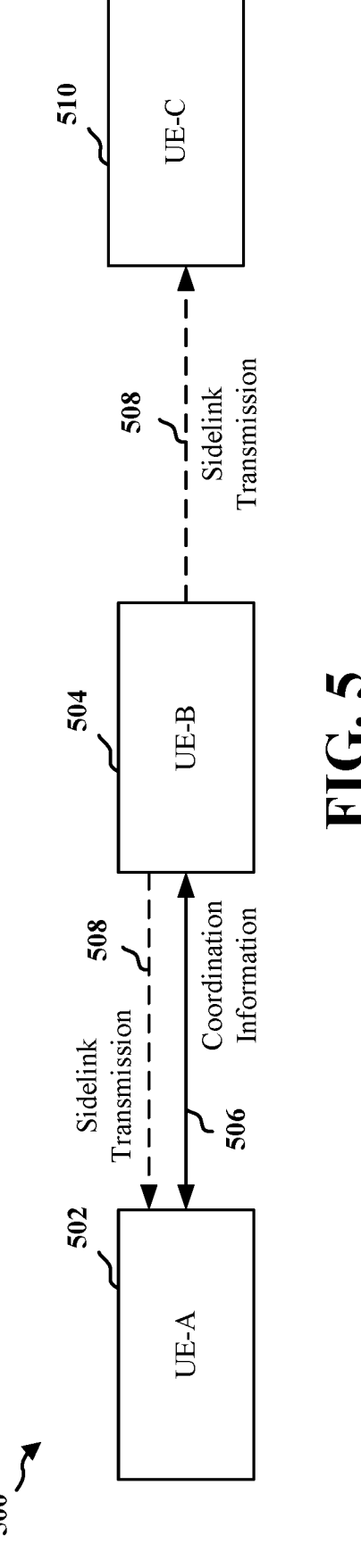
FIG. 5 illustrates an example of the exchange of inter-UE coordination information in accordance with various aspects presented herein.

To reduce or avoid resource collisions under such instances, and to improve sidelink communication among UEs, the UEs may coordinate among themselves by generating and sharing inter-UE coordination information with other UEs. FIG. 5 is a diagram 500 illustrating inter-UE coordination, where a first UE ("UE-A") 502 may send inter-UE coordination information 506 to a second UE ("UE-B") 504.

The inter-UE coordination information 506 may include a UE's own transmission and reservation, the UE's sensing information (e.g., resource reservations of other UEs that are sensed by UE 502 (e.g., UE-A)), resources that are bad or undesirable around the UE-A (e.g., resources subject to high interference), resources which are better than other resources, etc. In some aspects, such resource availability information may be referred to as non-preferred resource inter-UE coordination information. The inter-UE coordination information 506 may indicate candidate resources for sidelink transmission. In some aspects, such candidate resource information may be referred to as preferred resource inter-UE coordination information. For, a transmitting UE (e.g., UE 502) may use the inter-UE coordination information 506 to inform a receiving UE (e.g., UE 504) about which sub-channels and slots may be used for communicating with the transmitting UE and/or which sub-channels and slots may not be used because they are occupied or reserved by the transmitting UE and/or other UEs. The candidate resources may indicate a group of resources from which the UE 504 (e.g., UE-B) may select for the sidelink transmission 508. As illustrated, the sidelink transmission 508 may be for UE 502 or for one or more different UEs, e.g., UE-C 510. In some aspects, the inter-UE coordination information 506 may indicate resources for a sidelink transmission, e.g., particular resources on which the UE 504 is to transmit the sidelink transmission 508 rather than candidate resources that the UE 504 may select. In some aspects, the inter-UE coordination information 506 may indicate a half-duplex conflict. For example, the inter-UE coordination information 506 may indicate a collision in time and/or frequency for two transmitting UEs that are unable to receive the other, respective transmission in a half-duplex mode. In some aspects, the inter-UE coordination information 506 may indicate a collision of resources (e.g., reserved resources) in time and/or frequency. In some aspects, such collision information may be referred to as expected conflict inter-UE coordination information.

Based at least in part on the inter-UE coordination information 506 from the UE 502, the UE 504 may make a better selection of resources to use and/or reserve for its sidelink transmission 508 to avoid resource collisions. A UE 502 (e.g., UE-A) may share its inter-UE coordination information 506 with multiple UEs, and/or a UE (e.g., UE 504) may receive the inter-UE coordination information 506 from multiple UEs. Inter-UE coordination information 506 may be transmitted in any of various ways. In some aspects, the mechanism may be based on a payload size (e.g., a number of bits of information) or a type of information comprised in the inter-UE coordination information. The UE 502 may transmit inter-UE coordination information 506 in a PSFCH, e.g., indicating a resource collision or a half-duplex conflict indication. The UE 502 may transmit inter-UE coordination information 506 in SCI. For example, the UE 502 may transmit shared sensing information, candidate resource information for a sidelink transmission, or particular resources for a sidelink transmission in SCI-2 transmitted in PSSCH. For example, a first portion of SCI (e.g., SCI-1) may be transmitted in PSCCH, and a second portion of SCI (e.g., SCI-2) may be transmitted in PSSCH. The UE 502 may transmit inter-UE coordination information 506 in a MAC-CE. For example, the UE 502 may transmit shared sensing information, candidate resource information for a sidelink transmission, or particular resources for a sidelink transmission in the MAC-CE, e.g., on the PSSCH. The UE 502 may transmit the inter-UE coordination information 506 in a new physical channel (e.g., that is different than PSCCH, PSSCH, PSFCH, etc.). For example, in some aspects, the UE 502 may transmit the inter-UE coordination information 506 in a physical channel that is configured for, or dedicated to, inter-UE configuration information. In some aspects, the UE 502 may transmit the inter-UE coordination information 506 in RRC signaling.

Figure 7:
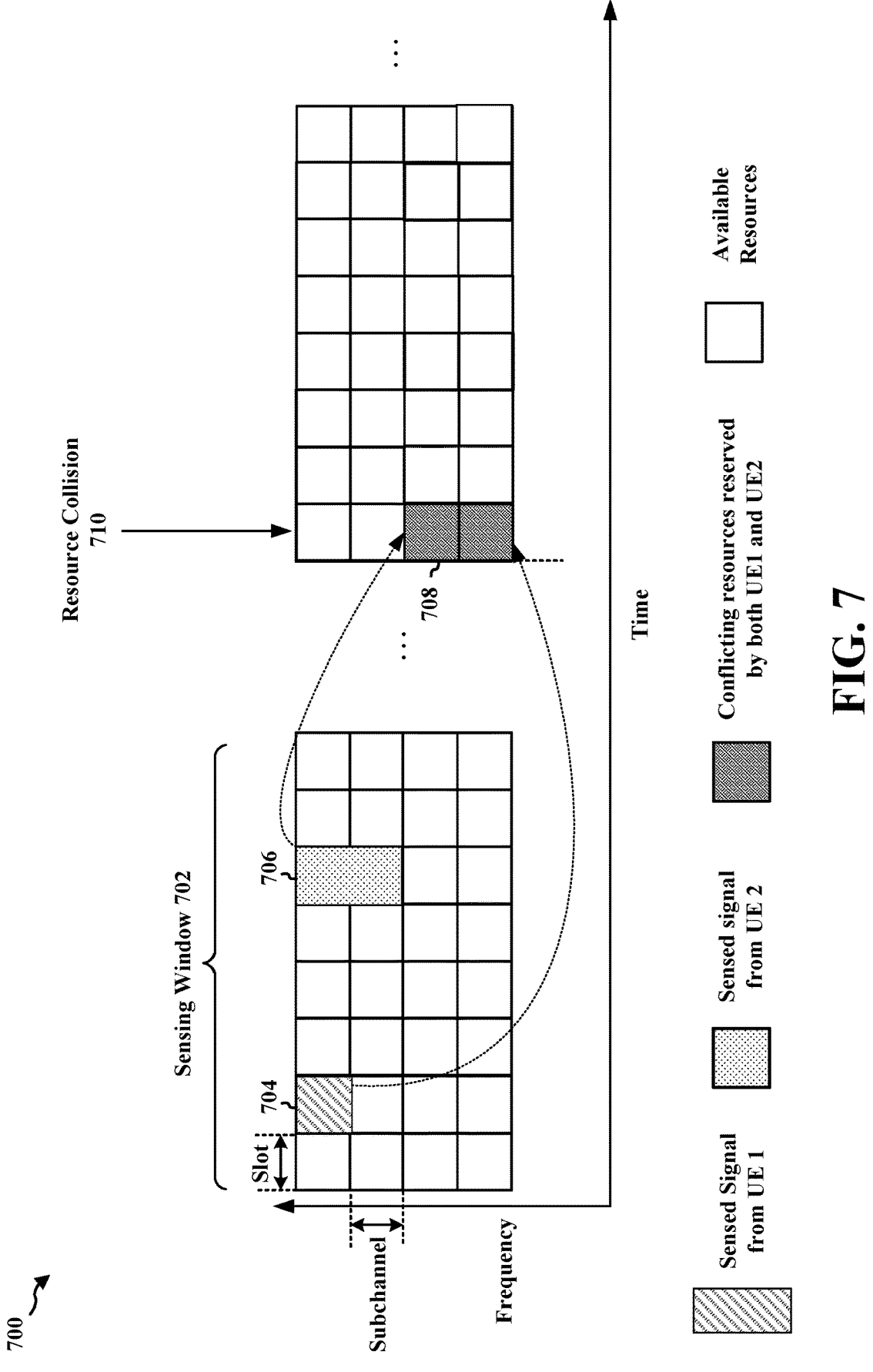
FIG. 7 illustrates an example diagram showing a resource collision in accordance with various aspects presented herein.

In some aspects, the UE 502 may transmit the inter-UE coordination information 506 periodically. In some aspects, the UE 502 may transmit aperiodic inter-UE coordination information 506 in response to a trigger. Among other examples, the trigger may be based on the occurrence of an event, such as the occurrence of, or detection of, a potential resource collision, the occurrence of/detection of a half-duplex conflict, etc. For example, if the UE 502 detects a resource collision between reserved or selected resources, the UE 502 may respond by transmitting inter-UE coordination information 506. FIG. 7 illustrates a diagram 700 showing an example in which the UE may sense signals 704 and 706 within a sensing window 702 both reserving the same resource 708. The UEs may also reserve non-overlapping resources, which are not shown. The UE may determine a resource collision 710 in the slot reserved by both UEs and may respond by transmitting inter-UE coordination information indicating the resource collision. In some aspects, the trigger may be based on receipt of a request for assistance information. For example, the UE 502 may receive a request from UE 504 requesting sidelink assistance information. In response to the request, the UE 502 may transmit the inter-UE coordination information 506 to the UE 504.

Figure 8:
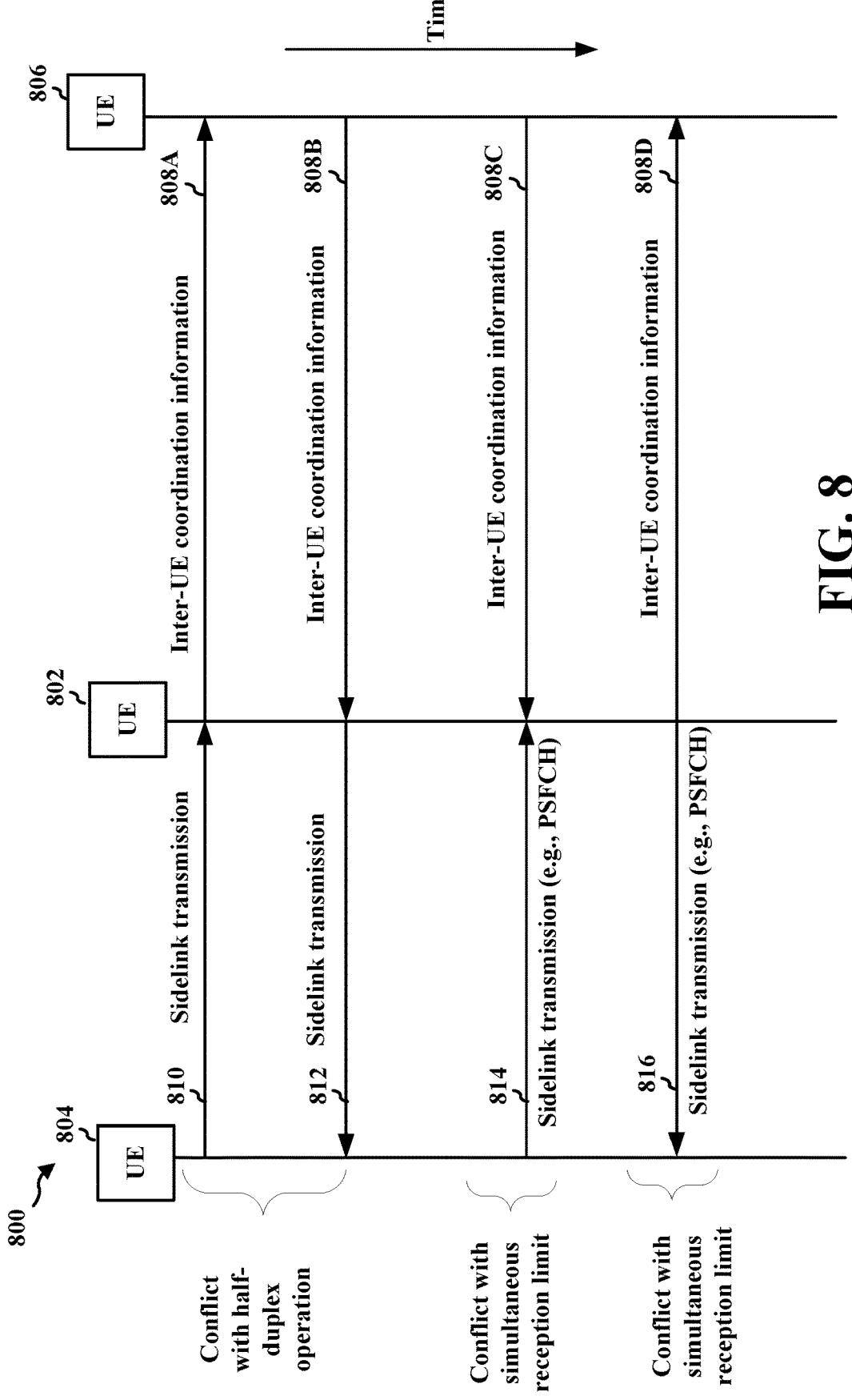
FIG. 8 illustrates various examples of inter-UE coordination information that overlaps in time with transmission or reception of another sidelink transmission in accordance with various aspects presented herein.

A half-duplex UE, or a UE operating in a half-duplex mode, may either transmit or receive wireless communication, but may not do both simultaneously. The UE may decide whether to receive or to transmit based on the priority of a transmission. The priority of a sidelink transmission may be indicated in SCI and may be obtained from higher layers. FIG. 8 illustrates a diagram 800 showing various examples of overlapping transmission/reception that overlap in time for the UE 802 with the transmission/reception of inter-UE coordination information 808A-D. Although FIG. 8 illustrates overlapping communication with two different UEs 804 and 806, the aspects may be similarly applied for overlapping transmissions with the same sidelink UE. FIG. 8 illustrates a first of a conflict with half-duplex operation in which the UE 802 may not receive the sidelink transmission 810 while transmitting the inter-UE coordination information 808A. FIG. 8 illustrates a second example conflict with half-duplex operation in which the UE 802 may not transmit the sidelink transmission 812 while receiving the inter-UE coordination information 808B. The UE 802 may determine to transmit one transmission and skip reception of the other or may determine to receive one sidelink transmission and skip transmission of the other.

There may be a limit to an amount of simultaneous transmissions, e.g. on PSFCH, that a UE may perform. In some aspects, the UE may determine to multiplex multiple transmissions that would overlap in time, e.g., to multiplex the inter-UE coordination information 506 with a sidelink data transmission (e.g., on PSSCH). The ability to multiplex the inter-UE coordination information may be based on the type of the overlapping sidelink transmission. If the transmission of both overlapping sidelink transmissions would exceed a limit/capability for the UE, the UE may select which transmissions to transmit on the PSFCH based on priority when the limit is exceeded. The priority may be obtained from received SCIs for which the PSFCH is transmitted. FIG. 8 illustrates that the UE 802 may determine that transmission of the inter-UE coordination information 808D and transmission of the other sidelink transmission 816 (e.g., PSFCH) exceeds a limit for the UE.

There may be a limit to an amount of simultaneous reception, e.g. on PSFCH, that a UE can perform. For example, the UE may select which PSFCH to receive based on priority when the limit is exceeded. The priority may be obtained from higher layers. FIG. 8 illustrates that the UE 802 may determine that reception of the inter-UE coordination information 808C and reception of the other sidelink transmission 814 (e.g., PSFCH) exceeds a limit for the UE.

Figure 9:
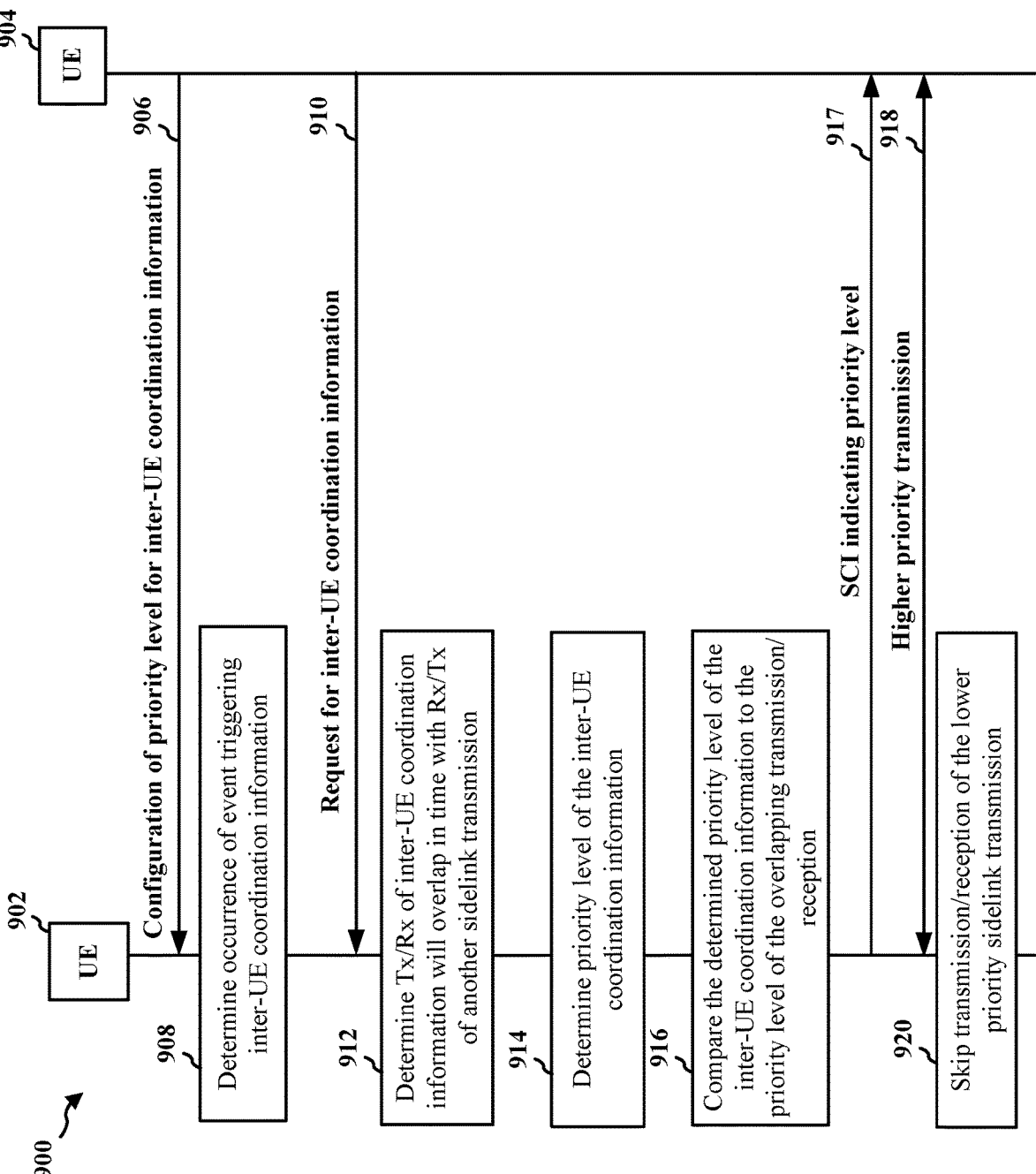
FIG. 9 illustrates aspects of an example communication flow including determining a priority level of inter-UE coordination information in accordance with various aspects presented herein.

FIG. 9 illustrates an example communication flow 900 between the UE 902 and the UE 904. As illustrated at 912, the UE 902 may determine that transmission or reception of inter-UE coordination information will overlap in time with transmission or reception of another sidelink transmission. The other sidelink transmission may be with the UE 904 or with another UE that is not illustrated in FIG. 9. When transmission/reception of inter-UE coordination information in a sidelink transmission will overlap in time with transmission/reception of another sidelink transmission, the UE 902 may compare, at 916, a priority level of the inter-UE coordination information to a priority level of the other sidelink transmission and may transmit/receive the higher priority transmission (e.g., between the inter-UE coordination information and the other sidelink transmission). The UE 902 may transmit or receive the higher priority transmission, at 918. In some aspects, a priority index for the higher priority transmission may have a lower numerical value than a lower priority index. As an example, a priority of "1" may indicate a higher priority (which may also be referred to as a higher priority level) than a priority of "2". As illustrated at 920, the UE 902 may drop, reschedule, or otherwise adjust transmission/reception of the lower priority transmission. In order to apply the comparison, at 916, the UE 902 may determine a priority level for the inter-UE coordination information, at 914. Aspects provided herein provide various mechanism that the UE 902 may employ to determine the priority level for the inter-UE coordination information. For example, the transmission 918 may include a sidelink transmission comprising inter-UE coordination information. The UE may determine a priority level for the sidelink transmission, and may indicate the priority level for the sidelink transmission comprising the inter-UE coordination information, e.g., in SCI 917 for the sidelink transmission.

In some aspects, the priority level of the inter-UE coordination information may be configured, e.g., at 906, and the UE 902 may determine the priority level, at 914, based on the configuration 906. In some aspects, the priority level may be preconfigured or known in advance by the UE 902. In some aspects, the priority level may be defined, or known, for inter-UE coordination information.

In some aspects, the UE 902 may determine the priority level of the inter-UE coordination information, at 914, based on the priority of related transmissions/reception. For example, the inter-UE coordination information may indicate sensing information, candidate resources, particular resources, half-duplex conflict, or resource collision for a first sidelink message. The priority level of the inter-UE coordination information may be based on the priority level of the first sidelink message. For example, the UE 902 may determine the priority level of the inter-UE coordination information to be the same as the priority level of the first sidelink message. In another example, the related transmission may be part of a triggering event. For example, if the inter-UE coordination information is triggered by the occurrence of an event (at 908) involving a first sidelink transmission, the UE 902 may determine the priority level of the inter-UE coordination information, at 914, based on the first sidelink message involved in the triggering event. As an example, if the UE detects a resource collision or a half-duplex conflict, at 908, that involves a first sidelink transmission and a second sidelink transmission and which triggers the transmission of inter-UE coordination information, the UE 902 may determine the priority level of the inter-UE coordination information based on (e.g., to be the same as) the maximum priority level of the first sidelink transmission and the second sidelink transmission involved in the conflict/collision. Alternatively, the UE 902 may determine the priority level of the inter-UE coordination information based on (e.g., to be the same as) the minimum priority level of the first sidelink transmission and the second sidelink transmission involved in the conflict/collision. In some aspects, the inter-UE coordination information may be triggered in response to a request 910. The UE 902 may determine the priority level of the inter-UE coordination information, at 914, based on the request 910, e.g., based on a level indicated in the request or based on a priority level of the request itself.

Figures 6A, 6B, 6C:
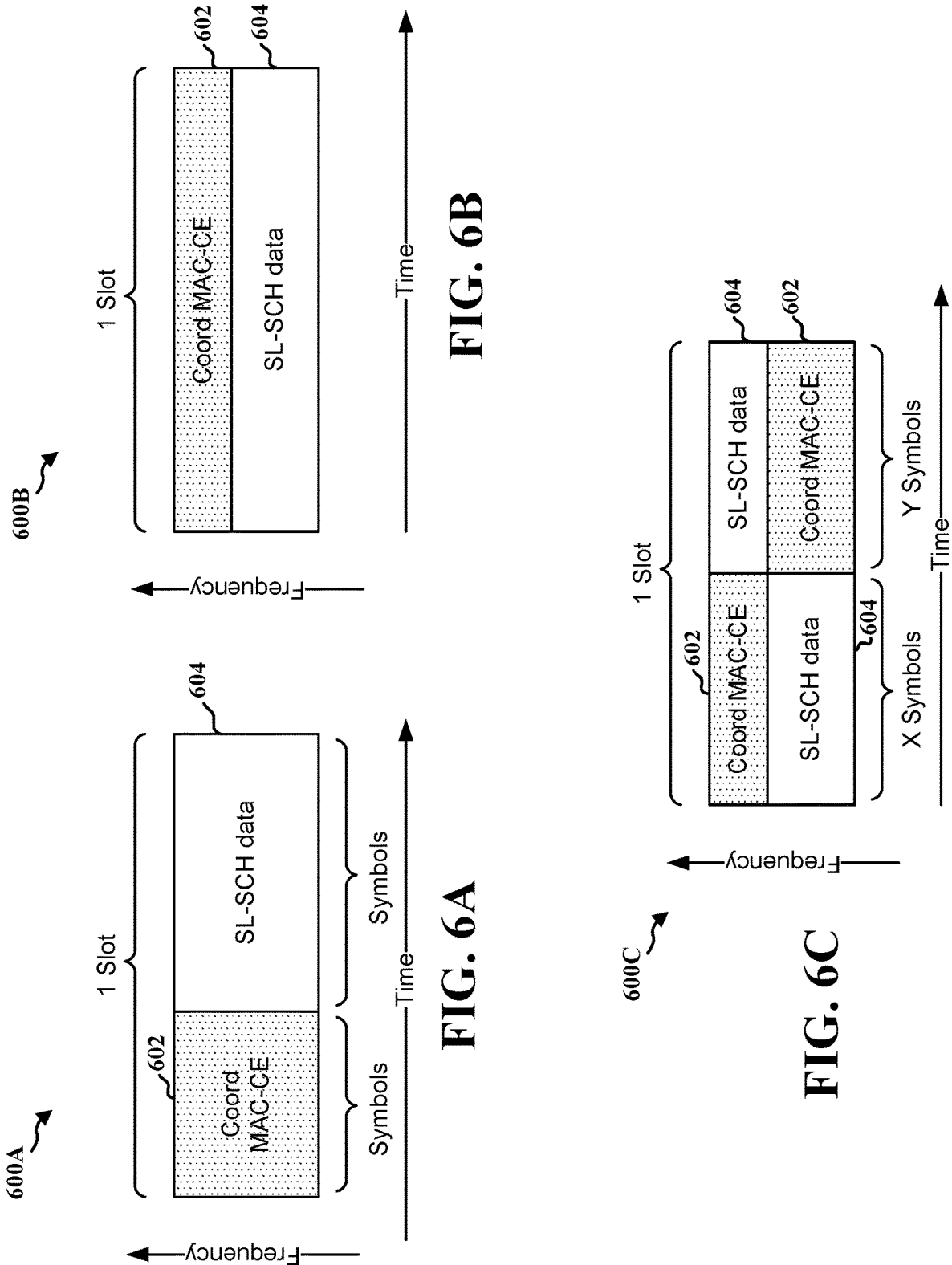
FIGS. 6A, 6B, and 6C illustrate examples of inter-UE coordination information multiplexed with another sidelink transmission in accordance with various aspects presented herein.

In some aspects, the UE 902 may multiplex the inter-UE coordination information with another sidelink transmission, such as a sidelink data transmission (e.g., on PSSCH). As an example of multiplexing, the MAC-CE carrying the inter-UE coordination information and the sidelink data may be encoded into separate TB s, and transmitted in a same shared channel and in the same resource window as a multiplexed transmission. The MAC-CE with the inter-UE coordination information may occupy different resources than the data within the same time slot in a resource window, and may be multiplexed based on time (e.g., timing division multiplexing (TDM)), frequency (e.g., frequency division multiplexing (FDM)), or a combination of both. FIGS. 6A, 6B and 6C illustrate example diagrams showing the MAC-CE 602 comprising inter-UE coordination information and the data 604 being combined based on various multiplexing schemes. FIG. 6A illustrates an example diagram 600A showing the inter-UE coordination information in MAC-CE 602 multiplexed in time with the data 604. FIG. 6B illustrates an example diagram 600B showing the inter-UE coordination information in MAC-CE 602 multiplexed in frequency with the data 604. FIG. 6C illustrates an example diagram 600C showing the inter-UE coordination information in MAC-CE 602 multiplexed in time and frequency with the data 604.

If inter-UE coordination information is multiplexed with another transmission, the UE 902 may determine the priority level of the inter-UE coordination information, at 914, based on the priority level of the other sidelink transmission with which the inter-UE coordination information is multiplexed. For example, in FIGS. 6A-C, the UE 902 may determine the priority level of the MAC-CE 602 including the inter-UE coordination information based on a priority level of the SL-SCH data 604 with which the inter-UE coordination information 602 is multiplexed.

In some aspects, the UE 902 may determine the priority level of the multiplexed transmission (and therefore the inter-UE coordination information) to be the higher of a first priority level of the inter-UE coordination information 602 and a second priority level of the other transmission (e.g., the data 604). The UE 902 may determine the first priority level of the inter-UE coordination information, at 914, based on any of the aspects described herein (e.g., as a configured priority level, a priority level based on a related transmission/reception, a priority level based on a transmission involved in an event that triggered the inter-UE coordination information, or a priority level based on a request that triggered the inter-UE coordination information).

The UE may indicate the priority level of a multiplexed transmission including inter-UE coordination information in SCI associated with the multiplexed transmission.

In other aspects, rather than multiplexing overlapping transmissions, the UE 902 may drop the lower priority transmission, at 920.

FIG. 10A is a flowchart 1000 of a method of wireless communication. The method may be performed by a sidelink device, such as a UE, an RSU, etc. For example, the method may be performed by the UE 104, 502, 504, 802, 902; the device 310 or 350; the apparatus 1102. The method may enable a UE to determine a priority level of inter-UE coordination information in order to address an overlap in time with transmission or reception of another sidelink transmission.

At 1004, the UE determines that a first transmission or first reception of a first sidelink transmission comprising inter-UE coordination information will overlap in time with a second reception or a second transmission of a second sidelink transmission. The determination may be performed, e.g., by the overlap determination component 1140 of the apparatus 1102 in FIG. 11. The determination may include aspects described in connection with the determination, at 912 in FIG. 9. The overlap may be based on any of the aspects described in connection with FIGS. 5-8.

At 1010, the UE transmits or receives a higher priority sidelink transmission among the first sidelink transmission comprising the inter-UE coordination information and the second sidelink transmission. The transmission or reception may be performed, e.g., by the reception component 1130 or the transmission component 1134 in connection with the prioritization component 1142 of the apparatus 1102 in FIG. 11. FIG. 9 illustrates an example of the UE 902 transmitting or receiving the higher priority transmission 918 and skipping the transmission/reception of the lower priority transmission, at 920.

FIG. 10B is a flowchart 1050 of a method of wireless communication. The method may be performed by a sidelink device, such as a UE, an RSU, etc. For example, the method may be performed by the UE 104, 502, 504, 802, 902; the device 310 or 350; the apparatus 1102. The method may include 1004 and 1010, as described in connection with FIG. 10A. As illustrated at 1008, the UE may compare a first priority for the first sidelink transmission comprising the inter-UE coordination information to a second priority for the second sidelink transmission to determine a higher priority sidelink transmission to transmit or receive. The comparison may be performed, e.g., by the prioritization component 1142 of the apparatus 1102 in FIG. 11. FIG. 9 illustrates an example of the UE 902 comparing the priorities of the inter-UE coordination information and an overlapping sidelink transmission, at 916. In order to perform the comparison, the UE 902 may determine the priority level of the inter-UE coordination information, at 914.

The UE may further receive a configuration of a priority associated with the inter-UE coordination information. FIG. 9 illustrates the UE 902 receiving a configuration 906 of a priority level for inter-UE coordination information. The UE may determine the priority of the inter-UE coordination information that overlaps the second transmission based on the configuration.

The first priority may be based on a sidelink message associated with the inter-UE coordination information. The inter-UE coordination information may indicate sensing information associated with one or more sidelink messages. The inter-UE coordination information may indicate candidate resources for one or more sidelink messages. The inter-UE coordination information may indicate resources for one or more sidelink messages. The inter-UE coordination information may indicate a half-duplex conflict between multiple sidelink messages. The first priority may be based on a highest priority among the multiple sidelink messages involved in the half-duplex conflict. The inter-UE coordination information indicates a resource collision of multiple sidelink messages. The first priority may be based on a highest priority among the multiple sidelink messages involved in the resource collision.

As illustrated at 1002, the UE may receive a request triggering the inter-UE coordination information, wherein the first priority is based on information comprised in the request. The reception may be performed, e.g., by the trigger component 1144 via the reception component 1130 of the apparatus 1102 in FIG. 11. The first sidelink transmission may comprise the inter-UE coordination information multiplexed with a third sidelink transmission. The first priority may be based on the third sidelink transmission with which the inter-UE coordination information is multiplexed. The first priority may be based on a highest priority associated with the inter-UE coordination information or the third sidelink transmission with which the inter-UE coordination information is multiplexed. The third sidelink transmission may have a third priority, and, as illustrated at 1006, the UE may determine a fourth priority for the inter-UE coordination information to be multiplexed with the third sidelink transmission, wherein the first priority is based on the highest priority among the third priority and the fourth priority. The determination may be performed, e.g., by the prioritization component 1142 of the apparatus 1102 in FIG. 11.

In some aspects, the first transmission of the first sidelink transmission comprising the inter-UE coordination information may overlap in time with the second reception of the second sidelink transmission. At 1012, the UE may transmit the first sidelink transmission comprising the inter-UE coordination information based on the inter-UE coordination information having a higher priority than the second reception of the second sidelink transmission. At 1014, the UE may skip the second reception of the second sidelink transmission. Alternatively, at 1016, the UE may receive the second sidelink transmission based on the inter-UE coordination information having a lower priority than the second reception of the second sidelink transmission, and at 1018, the UE may skip the first transmission of the first sidelink transmission comprising the inter-UE coordination information.

In other aspects, the first transmission of the first sidelink transmission comprising the inter-UE coordination information may overlap in time with the second transmission of the second sidelink transmission. As illustrated at 1012, the UE may transmit the first sidelink transmission comprising the inter-UE coordination information based on the inter-UE coordination information having a higher priority than the second transmission of the second sidelink transmission, and at 1014, the UE may skip the second transmission of the second sidelink transmission if transmission of the first sidelink transmission and the second sidelink transmission exceeds a limit on simultaneous transmission. Alternatively, at 1016, the UE may transmit the second sidelink transmission based on the inter-UE coordination information having a lower priority than the second transmission of the second sidelink transmission, and at 1018, the UE may skip the first transmission of the first sidelink transmission comprising the inter-UE coordination information if transmission of the first sidelink transmission and the second sidelink transmission exceeds a limit on simultaneous transmission.

In some aspects, the first reception of the first sidelink transmission comprising the inter-UE coordination information may overlap in time with the second transmission of the second sidelink transmission. At 1012, the UE may receive the first sidelink transmission comprising the inter-UE coordination information based on the inter-UE coordination information having a higher priority than the second transmission of the second sidelink transmission, and at 1014, the UE may skip the second transmission of the second sidelink transmission. Alternatively, at 1016, the UE may transmit the second sidelink transmission based on the inter-UE coordination information having a lower priority than the second transmission of the second sidelink transmission, and at 1018, skip the first reception of the first sidelink transmission comprising the inter-UE coordination information.

In some aspects, the first reception of the first sidelink transmission comprising the inter-UE coordination information may overlap in time with the second reception of the second sidelink transmission. At 1012, the UE may receive the first sidelink transmission comprising the inter-UE coordination information based on the inter-UE coordination information having a higher priority than the second reception of the second sidelink transmission, and at 1014, the UE may skip the second reception of the second sidelink transmission if reception of the first sidelink transmission and the second sidelink transmission exceeds a limit on simultaneous reception. Alternatively, at 1016, the UE may receive the second sidelink transmission based on the inter-UE coordination information having a lower priority than the second reception of the second sidelink transmission, and at 1018, the UE may skip the first reception of the first sidelink transmission comprising the inter-UE coordination information if reception of the first sidelink transmission and the second sidelink transmission exceeds a limit on simultaneous reception.

Figure 11:
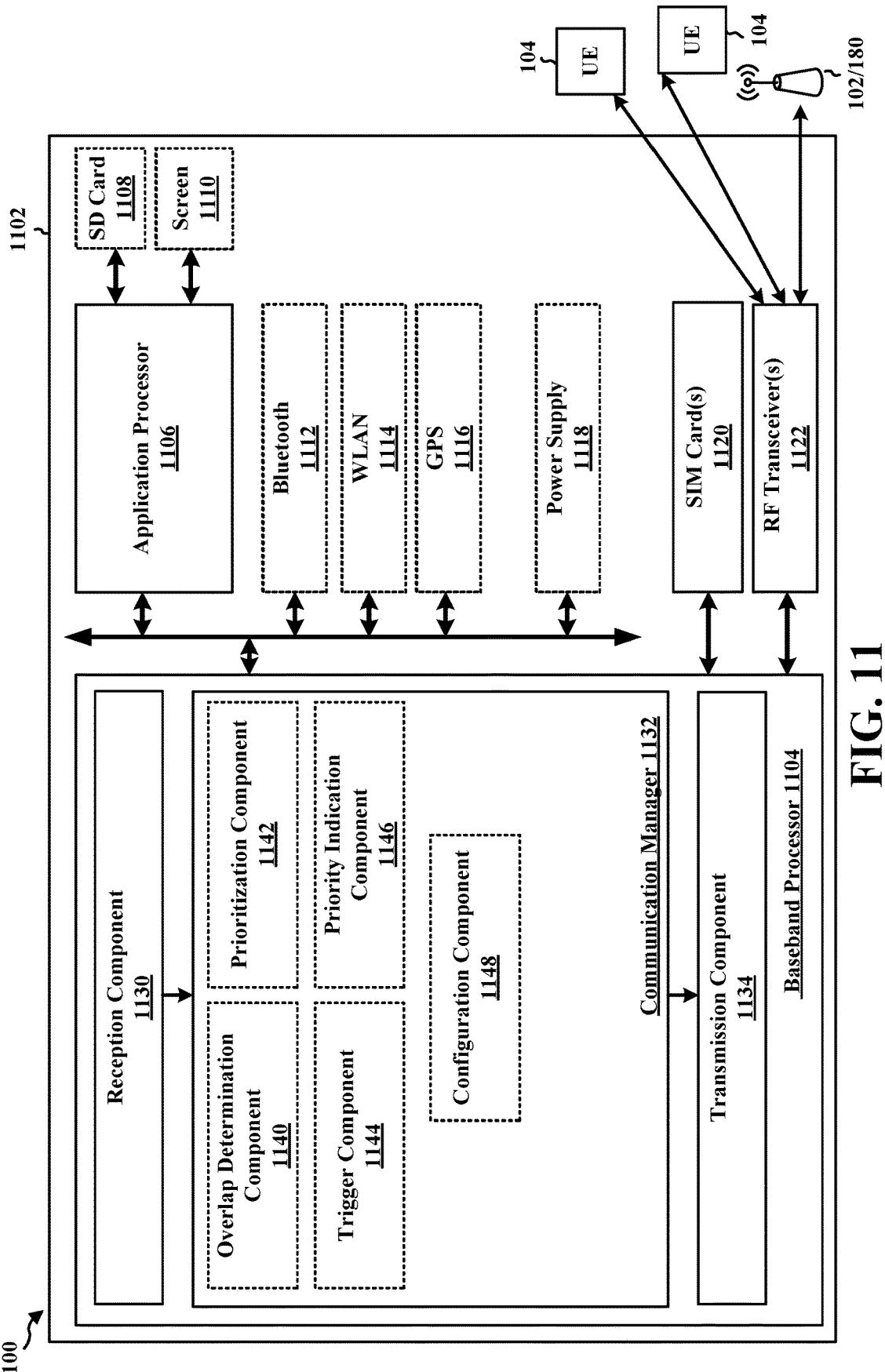
FIG. 11 is a diagram illustrating an example of a hardware implementation for an example apparatus in accordance with various aspects presented herein.

FIG. 11 is a diagram 1100 illustrating an example of a hardware implementation for an apparatus 1102. The apparatus 1102 is a sidelink device, such as a UE and includes a baseband processor 1104 (also referred to as a modem) coupled to a RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The baseband processor 1104 communicates through the RF transceiver 1122 with the UE 104 and/or BS 102/180. In some examples, the baseband processor 1104 may comprise a cellular baseband processor, and the RF transceiver 1122 may comprise a cellular RF transceiver. The baseband processor 1104 may include a computer-readable medium/ memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described supra. The computer-readable medium/ memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/ memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire wireless device (e.g., see 350 of FIG. 3) and include the additional modules of the apparatus 1102.

The communication manager 1132 includes an overlap determination component 1140 configured to determine that a first transmission or first reception of a first sidelink transmission comprising inter-UE coordination information will overlap in time with a second reception or a second transmission of a second sidelink transmission, e.g., as described in connection with 1004 in FIG. 10A or 10B. The apparatus 1102 includes a prioritization component 1142 configured to transmit or receive a higher priority sidelink transmission among the first sidelink transmission comprising the inter-UE coordination information and the second sidelink transmission, e.g., via the reception component 1130 or the transmission component 1134, as described in connection with 1010 in FIG. 10A or 10B. The prioritization component 1142 may be further configure to compare a first priority for the first sidelink transmission comprising the inter-UE coordination information to a second priority for the second sidelink transmission to determine a higher priority sidelink transmission to transmit or receive. In order to perform the comparison, the prioritization component 1142 may be configured to determine the priority of the inter-UE coordination information, e.g., as described in connection with 914. The reception component 1130 may be configured to receive a configuration of a priority associated with the inter-UE coordination information, e.g., as described in connection with the configuration 906 in FIG. 9. The apparatus 1102 may further include a trigger component 1144 configured to receive a request that triggers the transmission of the inter-UE coordination information, e.g., as described in connection with 1002 in FIG. 10B. The prioritization component 1142 may be configured to determine a priority for a sidelink transmission comprising inter-UE coordination information, e.g., as described in connection with 1204 in FIG. 12A or 12B. The apparatus 1102 may further include a priority indication component 1146 configured to indicate the determined priority for a sidelink transmission comprising inter-UE coordination information, e.g., as described in connection with 1208 in FIG. 12A or 12B. The prioritization component 1142 and/or the transmission component 1134 may be further configured to transmit the sidelink transmission based on the determined priority. The apparatus 1102 may further include a configuration component 1148 configured to receive a configuration of a priority for the inter-UE coordination information, e.g., as described in connection with 1201 in FIG. 12B.

The apparatus may include additional components that perform each of the blocks of the algorithm in the aforementioned flowcharts of FIGS. 9,10, and/or 12. As such, each block in the aforementioned flowcharts of FIGS. 9, 10, and/or 12 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for determining that a first transmission or first reception of a first sidelink transmission comprising inter-UE coordination information will overlap in time with a second reception or a second transmission of a second sidelink transmission; and means for transmitting or receiving a higher priority sidelink transmission among the first sidelink transmission comprising the inter-UE coordination information and the second sidelink transmission. The apparatus 1102 may further include means for comparing a first priority for the first sidelink transmission comprising the inter-UE coordination information to a second priority for the second sidelink transmission to determine a higher priority sidelink transmission to transmit or receive. The apparatus 1102 may further include means for receiving a configuration of a priority associated with the inter-UE coordination information. The apparatus 1102 may further include means for receiving a request triggering the inter-UE coordination information, wherein the first priority is based on information comprised in the request. The apparatus 1102 may further include means for determining a fourth priority for the inter-UE coordination information to be multiplexed with the third sidelink transmission, wherein the first priority is based on the highest priority among the third priority and the fourth priority. The apparatus 1102 may further include means for transmitting the first sidelink transmission comprising the inter-UE coordination information based on the inter-UE coordination information having a higher priority than the second reception of the second sidelink transmission; and means for skipping the second reception of the second sidelink transmission. The apparatus 1102 may further include means for receiving the second sidelink transmission based on the inter-UE coordination information having a lower priority than the second reception of the second sidelink transmission; and means for skipping the first transmission of the first sidelink transmission comprising the inter-UE coordination information. The apparatus 1102 may further include means for transmitting the first sidelink transmission comprising the inter-UE coordination information based on the inter-UE coordination information having a higher priority than the second transmission of the second sidelink transmission; and means for skipping the second transmission of the second sidelink transmission if transmission of the first sidelink transmission and the second sidelink transmission exceeds a limit on simultaneous transmission. The apparatus 1102 may further include means for transmitting the second sidelink transmission based on the inter-UE coordination information having a lower priority than the second transmission of the second sidelink transmission; and means for skipping the first transmission of the first sidelink transmission comprising the inter-UE coordination information if transmission of the first sidelink transmission and the second sidelink transmission exceeds a limit on simultaneous transmission. The apparatus 1102 may further include means for receiving the first sidelink transmission comprising the inter-UE coordination information based on the inter-UE coordination information having a higher priority than the second transmission of the second sidelink transmission; and means for skipping the second transmission of the second sidelink transmission. The apparatus 1102 may further include means for transmitting the second sidelink transmission based on the inter-UE coordination information having a lower priority than the second transmission of the second sidelink transmission; and means for skipping the first reception of the first sidelink transmission comprising the inter-UE coordination information. The apparatus 1102 may further include means for receiving the first sidelink transmission comprising the inter-UE coordination information based on the inter-UE coordination information having a higher priority than the second reception of the second sidelink transmission; and means for skipping the second reception of the second sidelink transmission if reception of the first sidelink transmission and the second sidelink transmission exceeds a limit on simultaneous reception. The apparatus 1102 may further include means for receiving the second sidelink transmission based on the inter-UE coordination information having a lower priority than the second reception of the second sidelink transmission; and means for skipping the first reception of the first sidelink transmission comprising the inter-UE coordination information if reception of the first sidelink transmission and the second sidelink transmission exceeds a limit on simultaneous reception. The apparatus 1102 may further include means for determining a priority for a sidelink transmission comprising inter-UE coordination information. The apparatus 1102 may further include means for indicating the priority for the sidelink transmission comprising the inter-UE coordination information and means for transmitting the sidelink transmission with the determined priority. The apparatus 1102 may further include means for receiving a configuration of the priority associated with the inter-UE coordination information, wherein the UE determines the priority of the sidelink transmission based on the configuration. The apparatus 1102 may further include means for receiving a request triggering the inter-UE coordination information, wherein the UE determines the priority based on information comprised in the request. The apparatus 1102 may further include means for determining a first priority for the inter-UE coordination information to be multiplexed with the second sidelink transmission, wherein the UE determines the priority of the sidelink transmission based on the highest priority among the first priority and the second priority. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12A is a flowchart 1200 of a method of wireless communication. The method may be performed by a sidelink device, such as a UE, an RSU, etc. For example, the method may be performed by the UE 104, 502, 504, 802, 902; the device 310 or 350; the apparatus 1102. The method may enable a UE to determine a priority of inter-UE coordination information for sidelink communication.

At 1204, the UE determines a priority for a sidelink transmission comprising inter-UE coordination information. The determination may be performed, e.g., by the prioritization component 1142 of the apparatus 1102 in FIG. 11. The determination may include aspects described in connection with the determination, at 914 in FIG. 9.

The first priority may be based on a sidelink message associated with the inter-UE coordination information. The inter-UE coordination information may indicate sensing information associated with one or more sidelink messages. The inter-UE coordination information may indicate candidate resources for one or more sidelink messages. The inter-UE coordination information may indicate resources for one or more sidelink messages. The inter-UE coordination information may indicate a half-duplex conflict between multiple sidelink messages. The UE may determine the priority based on a highest priority among the multiple sidelink messages involved in the half-duplex conflict. The inter-UE coordination information indicates a resource collision of multiple sidelink messages. The first priority may be based on a highest priority among the multiple sidelink messages involved in the resource collision.

At 1208, the UE transmits the sidelink transmission with an indication of the determined priority. The transmission may be performed, e.g., by the transmission component 1134 in connection with the prioritization component 1142 of the apparatus 1102 in FIG. 11. The UE may indicate the priority in SCI for the sidelink transmission. The indication may be performed, e.g., by a priority indication component 1146 of the apparatus 1102 in FIG. 11. FIG. 9 illustrates an example of the UE 902 transmitting a higher priority transmission 918, which may include the inter-UE coordination information.

FIG. 12B is a flowchart 1250 of a method of wireless communication. The method may be performed by a sidelink device, such as a UE, an RSU, etc. For example, the method may be performed by the UE 104, 502, 504, 802, 902; the device 310 or 350; the apparatus 1102. The method may include aspects of 1204 and 1208, as described in connection with FIG. 12A.

The UE may further receive a configuration of a priority associated with the inter-UE coordination information, as illustrated at 1201, and the UE may determine the priority, at 1204, based on the configuration. The reception of the configuration may be performed, e.g., by the configuration component 1148 of the apparatus 1102 in FIG. 11. FIG. 9 illustrates the UE 902 receiving a configuration 906 of a priority for inter-UE coordination information. The UE may determine the priority of the inter-UE coordination information that overlaps the second transmission based on the configuration.

As illustrated at 1202, the UE may receive a request triggering the inter-UE coordination information, and the UE may determine the priority based on information comprised in the request. The reception may be performed, e.g., by the trigger component 1144 via the reception component 1130 of the apparatus 1102 in FIG. 11. The first sidelink transmission may comprise the inter-UE coordination information multiplexed with a second sidelink transmission. The UE may determine the priority based on the second sidelink transmission with which the inter-UE coordination information is multiplexed. The UE may determine the priority based on a highest priority associated with the inter-UE coordination information or the third sidelink transmission with which the inter-UE coordination information is multiplexed. The second sidelink transmission may have a second priority, and, as illustrated at 1206, the UE may determine a first priority for the inter-UE coordination information to be multiplexed with the second sidelink transmission, and the UE may determine the priority based on the highest priority among the first priority and the second priority. The determination may be performed, e.g., by the prioritization component 1142 of the apparatus 1102 in FIG. 11.

The following example aspects are illustrative only and may be combined with other or teachings described herein, without limitation.

Aspect 1 is a method of wireless communication at a UE, comprising: determining that a first transmission or first reception of a first sidelink transmission comprising inter-UE coordination information will overlap in time with a second reception or a second transmission of a second sidelink transmission; and transmitting or receiving a higher priority sidelink transmission among the first sidelink transmission comprising the inter-UE coordination information and the second sidelink transmission.

In aspect 2, the method of aspect 1 further includes comparing a first priority for the first sidelink transmission comprising the inter-UE coordination information to a second priority for the second sidelink transmission to determine a higher priority sidelink transmission to transmit or receive.

In aspect 3, the method of aspect 1 or aspect 2 further includes that a first priority for the first sidelink transmission comprising the inter-UE coordination information is based on a sidelink message associated with the inter-UE coordination information.

In aspect 4, the method of aspect 3 further includes that the sidelink message associated with the inter-UE coordination information is the sidelink message that triggers the first sidelink transmission with the inter-UE coordination information.

In aspect 5, the method of aspect 3 or aspect 4 further includes receiving a request triggering the inter-UE coordination information, wherein the first priority is based on information comprised in the request.

In aspect 6, the method of aspect 1 or aspect 2 further includes receiving a configuration of a priority associated with the inter-UE coordination information.

In aspect 7, the method of any of aspects 1-6 further includes that the inter-UE coordination information indicates sensing information associated with the sidelink message.

In aspect 8, the method of any of aspects 1-7 further includes that the inter-UE coordination information indicates candidate resources for the sidelink message.

In aspect 9, the method of any of aspects 1-8 further includes that the inter-UE coordination information indicates resources for the sidelink message.

In aspect 10, the method of any of aspects 1-9 further includes that the inter-UE coordination information indicates a half-duplex conflict between multiple sidelink messages including the sidelink message.

In aspect 11, the method of aspect 10 further includes that the first priority is based on a highest priority among the multiple sidelink messages involved in the half-duplex conflict.

In aspect 12, the method of any of aspects 1-11 further includes that the inter-UE coordination information indicates a resource collision of multiple sidelink messages including the sidelink message.

In aspect 13, the method of aspect 12 further includes that the first priority is based on a highest priority among the multiple sidelink messages involved in the resource collision.

In aspect 14, the method of any of aspects 1-13 further includes receiving a request triggering the inter-UE coordination information, wherein the first priority is based on information comprised in the request.

In aspect 15, the method of any of aspects 1-14 further includes that the first sidelink transmission comprises the inter-UE coordination information multiplexed with a third sidelink transmission.

In aspect 16, the method of aspect 15 further includes that the first priority is based on the third sidelink transmission with which the inter-UE coordination information is multiplexed.

In aspect 17, the method of aspect 15 further includes that the first priority is based on a highest priority associated with the inter-UE coordination information or the third sidelink transmission with which the inter-UE coordination information is multiplexed.

In aspect 18, the method of aspect 17 further includes that the third sidelink transmission has a third priority, the method further comprising: determining a fourth priority for the inter-UE coordination information to be multiplexed with the third sidelink transmission, wherein the first priority is based on the highest priority among the third priority and the fourth priority.

In aspect 19, the method of any of aspects 1-18 further includes that the first transmission of the first sidelink transmission comprising the inter-UE coordination information will overlap in time with the second reception of the second sidelink transmission, the method further comprising: transmitting the first sidelink transmission comprising the inter-UE coordination information based on the inter-UE coordination information having a higher priority than the second reception of the second sidelink transmission; and skipping the second reception of the second sidelink transmission.

In aspect 20, the method of any of aspects 1-18 further includes that the first transmission of the first sidelink transmission comprising the inter-UE coordination information will overlap in time with the second reception of the second sidelink transmission, the method further comprising: receiving the second sidelink transmission based on the inter-UE coordination information having a lower priority than the second reception of the second sidelink transmission; and skipping the first transmission of the first sidelink transmission comprising the inter-UE coordination information.

In aspect 21, the method of any of aspects 1-18 further includes that the first transmission of the first sidelink transmission comprising the inter-UE coordination information will overlap in time with the second transmission of the second sidelink transmission, the method further comprising: transmitting the first sidelink transmission comprising the inter-UE coordination information based on the inter-UE coordination information having a higher priority than the second transmission of the second sidelink transmission; and skipping the second transmission of the second sidelink transmission if transmission of the first sidelink transmission and the second sidelink transmission exceeds a limit on simultaneous transmission.

In aspect 22, the method of any of aspects 1-18 further includes that the first transmission of the first sidelink transmission comprising the inter-UE coordination information will overlap in time with the second transmission of the second sidelink transmission, the method further comprising: transmitting the second sidelink transmission based on the inter-UE coordination information having a lower priority than the second transmission of the second sidelink transmission; and skipping the first transmission of the first sidelink transmission comprising the inter-UE coordination information if transmission of the first sidelink transmission and the second sidelink transmission exceeds a limit on simultaneous transmission.

In aspect 23, the method of any of aspects 1-18 further includes that the first reception of the first sidelink transmission comprising the inter-UE coordination information will overlap in time with the second transmission of the second sidelink transmission, the method further comprising: receiving the first sidelink transmission comprising the inter-UE coordination information based on the inter-UE coordination information having a higher priority than the second transmission of the second sidelink transmission; and skipping the second transmission of the second sidelink transmission.

In aspect 24, the method of any of aspects 1-18 further includes that the first reception of the first sidelink transmission comprising the inter-UE coordination information will overlap in time with the second transmission of the second sidelink transmission, the method further comprising: transmitting the second sidelink transmission based on the inter-UE coordination information having a lower priority than the second transmission of the second sidelink transmission; and skipping the first reception of the first sidelink transmission comprising the inter-UE coordination information.

In aspect 25, the method of any of aspects 1-18 further includes that the first reception of the first sidelink transmission comprising the inter-UE coordination information will overlap in time with the second reception of the second sidelink transmission, the method further comprising: receiving the first sidelink transmission comprising the inter-UE coordination information based on the inter-UE coordination information having a higher priority than the second reception of the second sidelink transmission; and skipping the second reception of the second sidelink transmission if reception of the first sidelink transmission and the second sidelink transmission exceeds a limit on simultaneous reception.

In aspect 26, the method of any of aspects 1-18 further includes that the first reception of the first sidelink transmission comprising the inter-UE coordination information will overlap in time with the second reception of the second sidelink transmission, the method further comprising: receiving the second sidelink transmission based on the inter-UE coordination information having a lower priority than the second reception of the second sidelink transmission; and skipping the first reception of the first sidelink transmission comprising the inter-UE coordination information if reception of the first sidelink transmission and the second sidelink transmission exceeds a limit on simultaneous reception.

Aspect 27 is an apparatus for wireless communication at a UE, comprising a memory; and at least one processor coupled to the memory and configured to perform the method of any of aspects 1-26.

In aspect 28, the apparatus of aspect 27 further includes at least one transceiver coupled to the at least one processor.

In aspect 29, the apparatus of aspect 27 or aspect 28 further includes at least one antenna coupled to the at least one processor.

Aspect 30 is an apparatus for wireless communication at a UE, comprising means to perform the method of any of claims 1-26.

In aspect 31, the apparatus of aspect 30 further includes at least one transceiver.

In aspect 32, the apparatus of aspect 30 or aspect 31 further includes at least one antenna.

Aspect 33 is a non-transitory computer-readable storage medium storing computer executable code for wireless communication at a UE, the code when executed by a processor cause the processor to perform the method of any of claims 1-26.

Aspect 34 is a method of wireless communication at a UE, comprising: determining a priority for a sidelink transmission comprising inter-UE coordination information; and transmitting the sidelink transmission with an indication of the determined priority.

In aspect 35, the method of aspect 34 further includes that the UE indicates the determined priority in SCI for the sidelink transmission comprising the inter-UE coordination information.

In aspect 36, the method of aspect 34 or aspect 35 further includes receiving a configuration of the priority associated with the inter-UE coordination information, wherein the UE determines the priority of the sidelink transmission based on the configuration.

In aspect 37, the method of aspect 34 or aspect 35 further includes that the UE determines the priority based on a sidelink message associated with the inter-UE coordination information.

In aspect 38, the method of aspect 37 further includes that the inter-UE coordination information indicates sensing information associated with the sidelink message.

In aspect 39, the method of aspect 37 or 38 further includes that the inter-UE coordination information indicates candidate resources for the sidelink message.

In aspect 40, the method of any of aspects 37-39 further include that the inter-UE coordination information indicates resources for the sidelink message.

In aspect 41, the method of any of aspects 37-40 further include that the inter-UE coordination information indicates a half-duplex conflict between multiple sidelink messages including the sidelink message.

In aspect 42, the method of aspect 41 further include that the UE determines the priority based on a highest priority among the multiple sidelink messages involved in the half-duplex conflict.

In aspect 43, the method of any of aspects 37-40 further include that the inter-UE coordination information indicates a resource collision of multiple sidelink messages including the sidelink message.

In aspect 43, the method of aspect 36 further include that the UE determines the priority based on a highest priority among the multiple sidelink messages involved in the resource collision.

In aspect 44, the method of any of aspects 37-43 further include that receiving a request triggering the inter-UE coordination information, wherein the UE determines the priority based on information comprised in the request.

In aspect 45, the method of any of aspects 37-44 further include that the sidelink transmission comprises the inter-UE coordination information multiplexed with a second sidelink transmission.

In aspect 46, the method of aspect 45 further includes that the UE determines the priority is based on the second sidelink transmission with which the inter-UE coordination information is multiplexed.

In aspect 47, the method of aspect 45 further includes the UE determines the priority based on a highest priority associated with the inter-UE coordination information or the second sidelink transmission with which the inter-UE coordination information is multiplexed.

In aspect 48, the method of aspect 47 further includes the second sidelink transmission has a second priority, the method further comprising: determining a first priority for the inter-UE coordination information to be multiplexed with the second sidelink transmission, wherein the UE determines the priority of the sidelink transmission based on the highest priority among the first priority and the second priority.

Aspect 49 is an apparatus for wireless communication at a UE, comprising: a memory and at least one processor coupled to the memory configured to perform the method of any of aspects 37-48.

In aspect 50, the apparatus of aspect 49 further includes at least one transceiver coupled to the at least one processor.

In aspect 51, the apparatus of aspect 49 or aspect 50 further includes at least one antenna coupled to the at least one processor.

Aspect 52 is an apparatus for wireless communication at a UE, comprising: means for performing the method of any of aspects 37-48.

In aspect 53, the apparatus of aspect 52 further includes at least one transceiver.

In aspect 54, the apparatus of aspect 52 or aspect 53 further includes at least one antenna.

Aspect 55 is a computer-readable storage medium storing computer executable code for wireless communication at a UE, the code when executed by a processor cause the processor to perform the method of any of aspects 37-48.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:

memory; and at least one processor coupled to the memory and configured to:

determine a first priority of a first sidelink transmission of inter-UE coordination information that indicates at least one of a set of preferred resources for use by a different UE based on sensing at the UE, a set of non-preferred resources for use by the different UE based on the sensing at the UE, or collision information for two transmitting UEs, wherein, based on the inter-UE coordination information being included in the first sidelink transmission that is multiplexed with a third sidelink transmission, the first priority is determined based on one of:

the third sidelink transmission with which the inter-UE coordination information is multiplexed, or a highest priority between priorities associated with the inter-UE coordination information and the third sidelink transmission with which the inter-UE coordination information is multiplexed;

determine that a first transmission or first reception, at the UE, of the first sidelink transmission comprising the inter-UE coordination information will overlap in time with a second reception or a second transmission, at the UE, of a second sidelink transmission; and transmit or receive, at the UE, a higher priority sidelink transmission among the first sidelink transmission comprising the inter-UE coordination information and the second sidelink transmission.

2. The apparatus of claim 1, wherein the first priority for the first sidelink transmission comprising the inter-UE coordination information is based on a sidelink message associated with the inter-UE coordination information.

3. The apparatus of claim 1, wherein the at least one processor is further configured to:

receive a request triggering the inter-UE coordination information, wherein a priority of the inter-UE coordination information is based on information comprised in the request triggering the inter-UE coordination information.

4. The apparatus of claim 1, further comprising:

at least one transceiver coupled to the at least one processor, wherein the at least one processor is further configured to:

compare the first priority for the first sidelink transmission comprising the inter-UE coordination information to a second priority for the second sidelink transmission to determine the higher priority sidelink transmission to transmit or receive.

5. The apparatus of claim 1, wherein the at least one processor is further configured to:

receive a prior configuration of a priority associated with the inter-UE coordination information.

6. The apparatus of claim 1, wherein the inter-UE coordination information indicates at least one of:

sensing information associated with one or more sidelink messages, candidate resources for the one or more sidelink messages, or a half-duplex conflict between multiple sidelink messages.

7. The apparatus of claim 1, wherein the inter-UE coordination information indicates a resource collision of multiple sidelink messages, and the first priority of the first sidelink transmission is based on the highest priority among the multiple sidelink messages involved in the resource collision.

8. The apparatus of claim 1, wherein the at least one processor is further configured to:

multiplex the inter-UE coordination information with the third sidelink transmission, wherein the first priority of the first sidelink transmission is based on a second priority of the third sidelink transmission with which the inter-UE coordination information is multiplexed.

9. The apparatus of claim 1, wherein the at least one processor is further configured to:

multiplex the inter-UE coordination information with the third sidelink transmission, wherein the first priority of the first sidelink transmission is based on the highest priority between the priorities associated with the inter-UE coordination information and a second priority associated with the third sidelink transmission with which the inter-UE coordination information is multiplexed.

10. The apparatus of claim 1, wherein the at least one processor is further configured to:

skip transmission or reception of a lower priority sidelink transmission among the first sidelink transmission comprising the inter-UE coordination information and the second sidelink transmission.

11. The apparatus of claim 10, wherein to skip the transmission or the reception of, the at least one processor is configured to:

skip the transmission of the lower priority sidelink transmission among the first sidelink transmission comprising the inter-UE coordination information and the second sidelink transmission if the transmission of the lower priority sidelink transmission would exceed a limit on simultaneous transmission.

12. The apparatus of claim 1, wherein the inter-UE coordination information indicates the set of preferred resources for sidelink transmission to UE, and wherein the first priority of the first sidelink transmission that includes the inter-UE coordination information is based on the highest priority between the priorities associated with the inter-UE coordination information and the third sidelink transmission with which the inter-UE coordination information is multiplexed.

13. The apparatus of claim 1, wherein the inter-UE coordination information indicates the set of non-preferred resources for sidelink transmission to UE, and wherein the first priority of the first sidelink transmission that includes the inter-UE coordination information is based on the highest priority between the priorities associated with the inter-UE coordination information and the third sidelink transmission with which the inter-UE coordination information is multiplexed.

14. The apparatus of claim 1, wherein the inter-UE coordination information indicates the collision information for the two transmitting UEs, and wherein the first priority of the first sidelink transmission that includes the inter-UE coordination information is based on the highest priority between the priorities associated with the inter-UE coordination information and the third sidelink transmission with which the inter-UE coordination information is multiplexed.

15. A method of wireless communication at a user equipment (UE), comprising:

determining a first priority of a first sidelink transmission of inter-UE coordination information that indicates at least one of a set of preferred resources for use by a different UE based on sensing at the UE, a set of non-preferred resources for use by the different UE based on the sensing at the UE, or collision information for two transmitting UEs, wherein, based on the inter-UE coordination information being included in the first sidelink transmission that is multiplexed with a third sidelink transmission, the first priority is determined based on one of:

the third sidelink transmission with which the inter-UE coordination information is multiplexed, or a highest priority between priorities associated with the inter-UE coordination information and the third sidelink transmission with which the inter-UE coordination information is multiplexed;

determining that a first transmission or first reception, at the UE, of the first sidelink transmission comprising the inter-UE coordination information will overlap in time with a second reception or a second transmission, at the UE, of a second sidelink transmission; and transmitting or receiving, at the UE, a higher priority sidelink transmission among the first sidelink transmission comprising the inter-UE coordination information and the second sidelink transmission.

16. The method of claim 15, wherein the first priority for the first sidelink transmission comprising the inter-UE coordination information is based on a sidelink message associated with the inter-UE coordination information.

17. The method of claim 16, further comprising:

receiving a request triggering the inter-UE coordination information, wherein a priority of the inter-UE coordination information is based on information comprised in the request triggering the inter-UE coordination information or a prior configuration of the priority associated with the inter-UE coordination information.

18. The method of claim 15, further comprising:

comparing the first priority for the first sidelink transmission comprising the inter-UE coordination information to a second priority for the second sidelink transmission to determine the higher priority sidelink transmission to transmit or receive.

19. The method of claim 15, further comprising:

receiving a prior configuration of priority information associated with the inter-UE coordination information.

20. The method of claim 15, further comprising:

multiplexing the inter-UE coordination information with the third sidelink transmission, wherein the first priority of the first sidelink transmission is based on a second priority of the third sidelink transmission with which the inter-UE coordination information is multiplexed.

21. The method of claim 15, further comprising:

multiplexing the inter-UE coordination information with the third sidelink transmission, wherein the first priority of the first sidelink transmission is based on the highest priority between the priorities associated with the inter-UE coordination information and a second priority associated with the third sidelink transmission with which the inter-UE coordination information is multiplexed.

22. An apparatus for wireless communication at a user equipment (UE), comprising:

memory; and at least one processor coupled to the memory and configured to:

determine a priority for a sidelink transmission comprising inter-UE coordination information that indicates candidate resources available for one or more future sidelink transmissions, wherein based on the inter-UE coordination information being multiplexed with a second sidelink transmission, the priority of the sidelink transmission that includes the inter-UE coordination information is based on one of:

the second sidelink transmission with which the inter-UE coordination information is multiplexed, or a highest priority between priorities associated with the inter-UE coordination information and the second sidelink transmission with which the inter-UE coordination information is multiplexed; and transmit the sidelink transmission with an indication of the determined priority.

23. The apparatus of claim 22, wherein the indication of the determined priority is in sidelink control information (SCI) for the sidelink transmission comprising the inter-UE coordination information.

24. The apparatus of claim 22, wherein the at least one processor is further configured to:

receive a configuration of priority information associated with the inter-UE coordination information.

25. The apparatus of claim 22, wherein the priority is based on a sidelink message associated with the inter-UE coordination information.

26. The apparatus of claim 25, wherein the inter-UE coordination information further indicates at least one of:

sensing information associated with one or more sidelink messages, or resources for the one or more sidelink messages.

27. The apparatus of claim 25, wherein the inter-UE coordination information indicates a half-duplex conflict between multiple sidelink messages, and the priority is based on the highest priority among the multiple sidelink messages involved in the half-duplex conflict.

28. The apparatus of claim 25, wherein the inter-UE coordination information indicates a resource collision of multiple sidelink messages, and the priority is based on the highest priority among the multiple sidelink messages involved in the resource collision.

29. The apparatus of claim 22, wherein the sidelink transmission comprises the inter-UE coordination information multiplexed with the second sidelink transmission, and the priority is based on the second sidelink transmission with which the inter-UE coordination information is multiplexed.

30. The apparatus of claim 22, wherein the inter-UE coordination information indicates preferred candidate resources.

31. The apparatus of claim 22, wherein the inter-UE coordination information indicates non-preferred candidate resources.

32. The apparatus of claim 22, wherein the priority is based on the highest priority associated with the inter-UE coordination information or the second sidelink transmission with which the inter-UE coordination information is multiplexed.

33. A method of wireless communication at a user equipment (UE), comprising:

determining a priority for a sidelink transmission comprising inter-UE coordination information that indicates candidate resources available for one or more future sidelink transmissions, wherein based on the inter-UE coordination information being multiplexed with a second sidelink transmission, the priority of the sidelink transmission that includes the inter-UE coordination information is based on one of:

the second sidelink transmission with which the inter-UE coordination information is multiplexed, or a highest priority between priorities associated with the inter-UE coordination information and the second sidelink transmission with which the inter-UE coordination information is multiplexed; and transmitting the sidelink transmission with an indication of the determined priority.

34. The method of claim 33, wherein the UE indicates the determined priority in sidelink control information (SCI) for the sidelink transmission comprising the inter-UE coordination information.

35. The method of claim 33, further comprising:

receiving a request triggering the inter-UE coordination information, wherein the priority of the inter-UE coordination information is based on information comprised in the request triggering the inter-UE coordination information.

36. The method of claim 33, further comprising:

multiplexing the inter-UE coordination information with the second sidelink transmission, wherein the priority is determined based on a second priority of the second sidelink transmission with which the inter-UE coordination information is multiplexed.

37. The method of claim 33, further comprising:

multiplexing the inter-UE coordination information with the second sidelink transmission, wherein the priority of the sidelink transmission is based on the highest priority between the priorities associated with the inter-UE coordination information and the second sidelink transmission with which the inter-UE coordination information is multiplexed.

\* \* \* \* \*